(12) United States Patent
Kimura

(10) Patent No.: US 9,134,516 B2
(45) Date of Patent: Sep. 15, 2015

(54) ZOOM LENS, OPTICAL APPARATUS AND METHOD FOR MANUFACTURING ZOOM LENS

(75) Inventor: Yoko Kimura, Ayase (JP)

(73) Assignee: Nikon Corporation, Tokyo (JP)

(*) Notice: Subject to any disclaimer, the term of this patent is extended or adjusted under 35 U.S.C. 154(b) by 233 days.

(21) Appl. No.: 13/402,956

(22) Filed: Feb. 23, 2012

(65) Prior Publication Data

US 2012/0218646 A1    Aug. 30, 2012

(30) Foreign Application Priority Data

Feb. 24, 2011  (JP) .................................. 2011-038968

(51) Int. Cl.
*G02B 15/16* (2006.01)
*G02B 15/177* (2006.01)
*G02B 27/64* (2006.01)

(52) U.S. Cl.
CPC ............ *G02B 15/177* (2013.01); *G02B 15/161* (2013.01); *G02B 27/646* (2013.01); *Y10T 29/49826* (2015.01)

(58) Field of Classification Search
CPC .... G02B 15/161; G02B 15/14; G02B 15/163; G02B 15/177; G03B 2205/007
USPC .......................... 359/691, 651, 682
See application file for complete search history.

(56) References Cited

U.S. PATENT DOCUMENTS

| 4,364,641 | A |   | 12/1982 | Mogami |  |
| 4,586,793 | A | * | 5/1986  | Tanaka et al. ................. | 359/680 |
| 5,329,402 | A | * | 7/1994  | Sato ............................... | 359/691 |
| 5,847,875 | A | * | 12/1998 | Kodama et al. ............... | 359/557 |
| 5,963,379 | A | * | 10/1999 | Sato et al. ..................... | 359/691 |
| 6,441,967 | B2 |  | 8/2002  | Furuta |  |
| 6,809,882 | B2 |  | 10/2004 | Takatsuki |  |
| 6,943,958 | B2 |  | 9/2005  | Ozaki et al. |  |
| 6,989,941 | B2 | * | 1/2006  | Tomioka ....................... | 359/680 |
| 7,982,965 | B2 |  | 7/2011  | Muratani |  |
| 8,085,474 | B2 |  | 12/2011 | Wei |  |
| 8,369,021 | B2 |  | 2/2013  | Muratani et al. |  |
| 2001/0030812 | A1 |  | 10/2001 | Furuta |  |
| 2002/0176177 | A1 |  | 11/2002 | Takatsuki |  |
| 2003/0179466 | A1 |  | 9/2003  | Takatsuki |  |
| 2004/0150890 | A1 | * | 8/2004  | Sato .............................. | 359/680 |
| 2005/0041302 | A1 |  | 2/2005  | Ozaki et al. |  |
| 2010/0039710 | A1 | * | 2/2010  | Wei ............................... | 359/691 |
| 2010/0195214 | A1 |  | 8/2010  | Muratani |  |
| 2010/0238560 | A1 | * | 9/2010  | Fujimoto ..................... | 359/682 |
| 2011/0134537 | A1 |  | 6/2011  | Muratani |  |

FOREIGN PATENT DOCUMENTS

JP    56-095211 A    8/1981
JP   2001-330774 A   11/2001

(Continued)

*Primary Examiner* — Zachary Wilkes
(74) *Attorney, Agent, or Firm* — Miles & Stockbridge P.C.

(57) ABSTRACT

A zoom lens consisting of, in order from an object side: a first lens group G1 having negative refractive power; and a second lens group G2 having positive refractive power, the first lens group G1 including, in order from the object side, a first negative meniscus lens having a convex surface facing the object side, a negative lens, a second negative meniscus lens having a convex surface facing the object side, and a positive lens, a distance between the first lens group G1 and the second lens group G2 being varied thereby carrying out zooming, and given conditional expressions being satisfied, thereby providing a zoom lens having excellent optical performance and high resolution with being compact and lightweight, an optical apparatus, and a method for manufacturing the zoom lens.

24 Claims, 19 Drawing Sheets

(56) References Cited

FOREIGN PATENT DOCUMENTS

| JP | 2002-277737 A | 9/2002 |
| JP | 2005-062770 A | 3/2005 |
| JP | 2010-044226 A | 2/2010 |
| JP | 2010-044235 A | 2/2010 |
| JP | 2010-181518 A | 8/2010 |

* cited by examiner

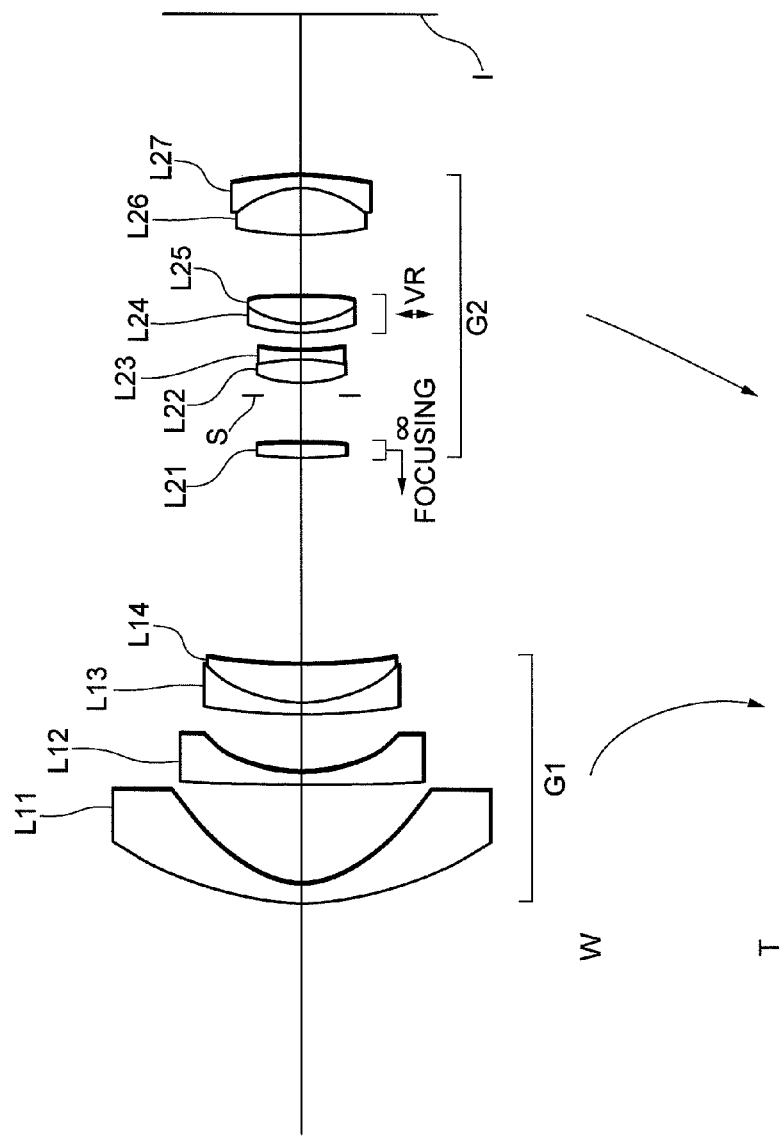

FIG. 2A
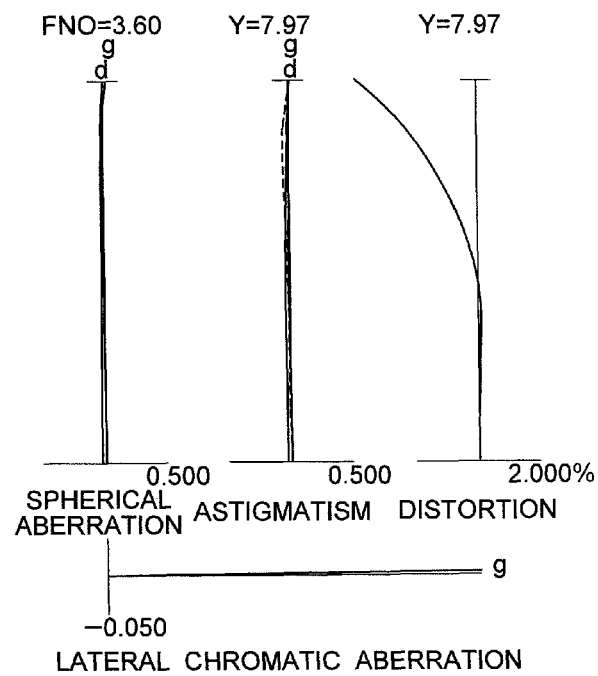
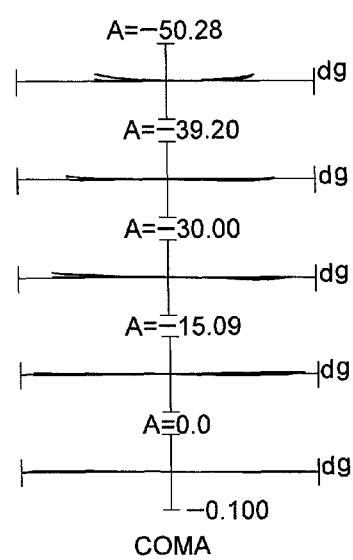
FIG. 2B
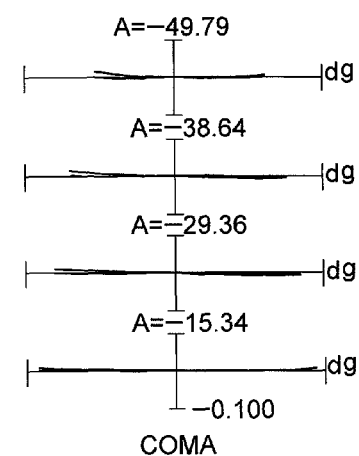

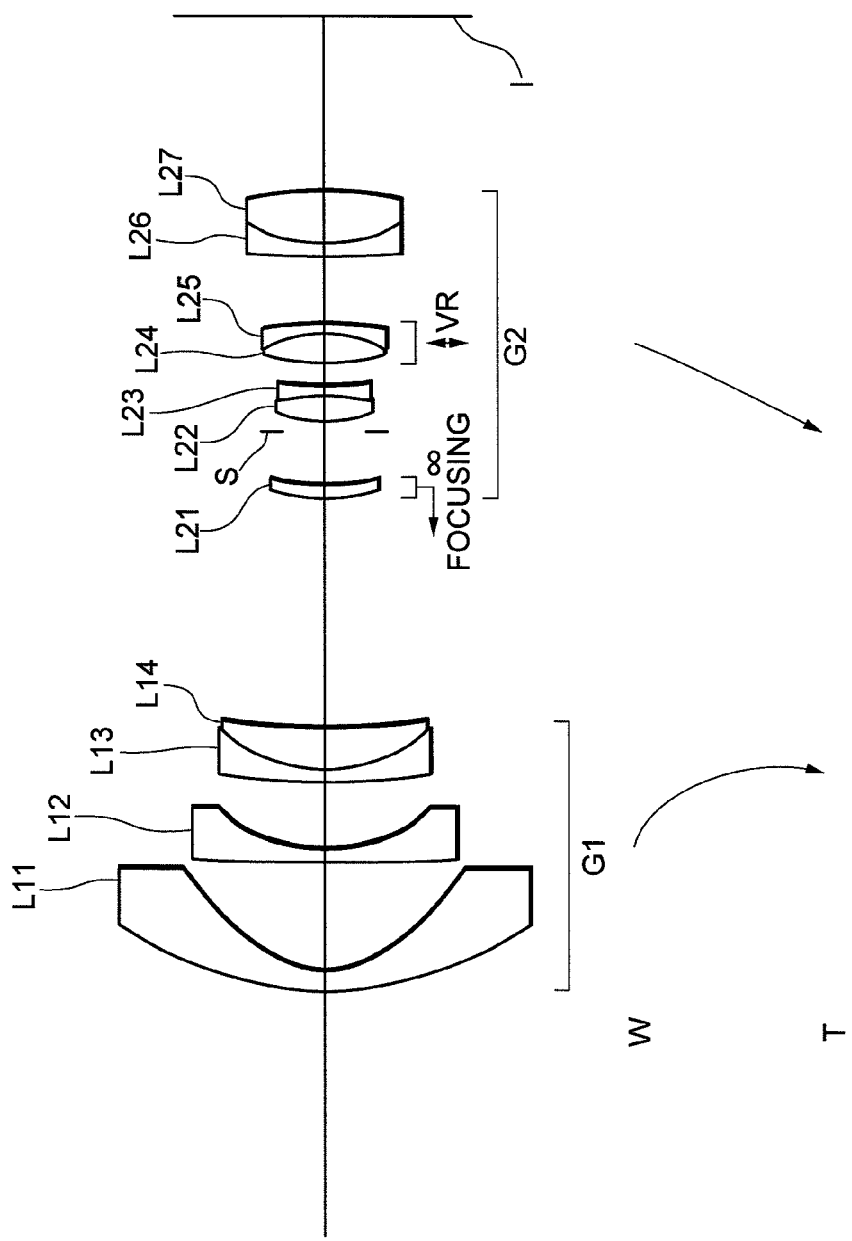

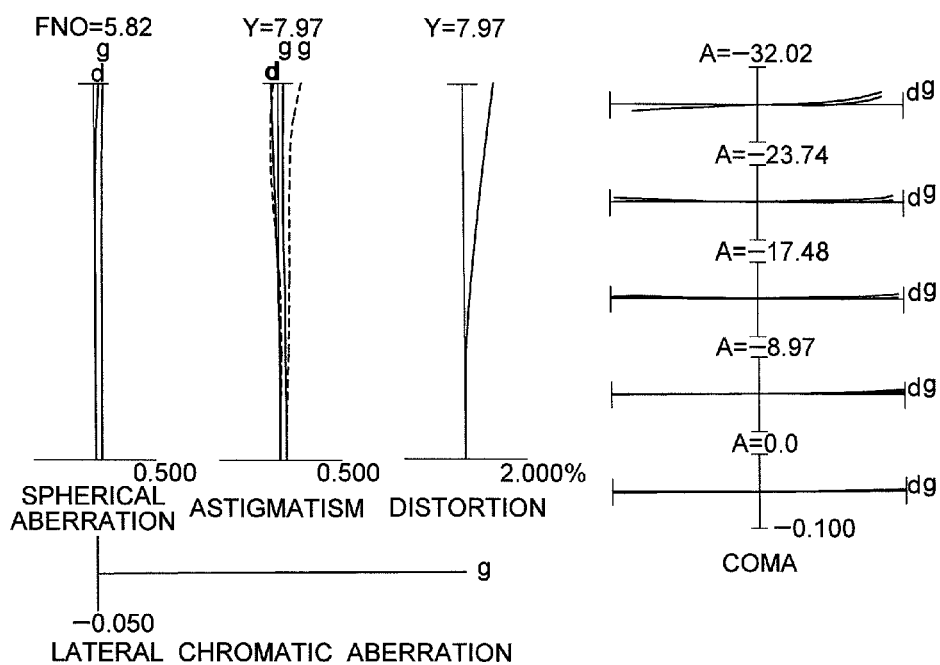
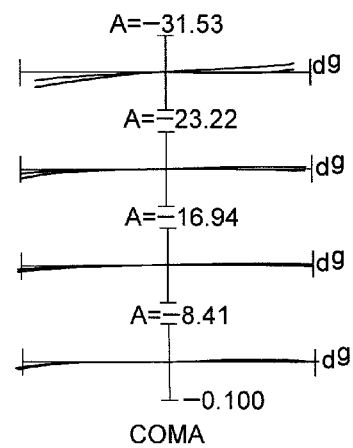

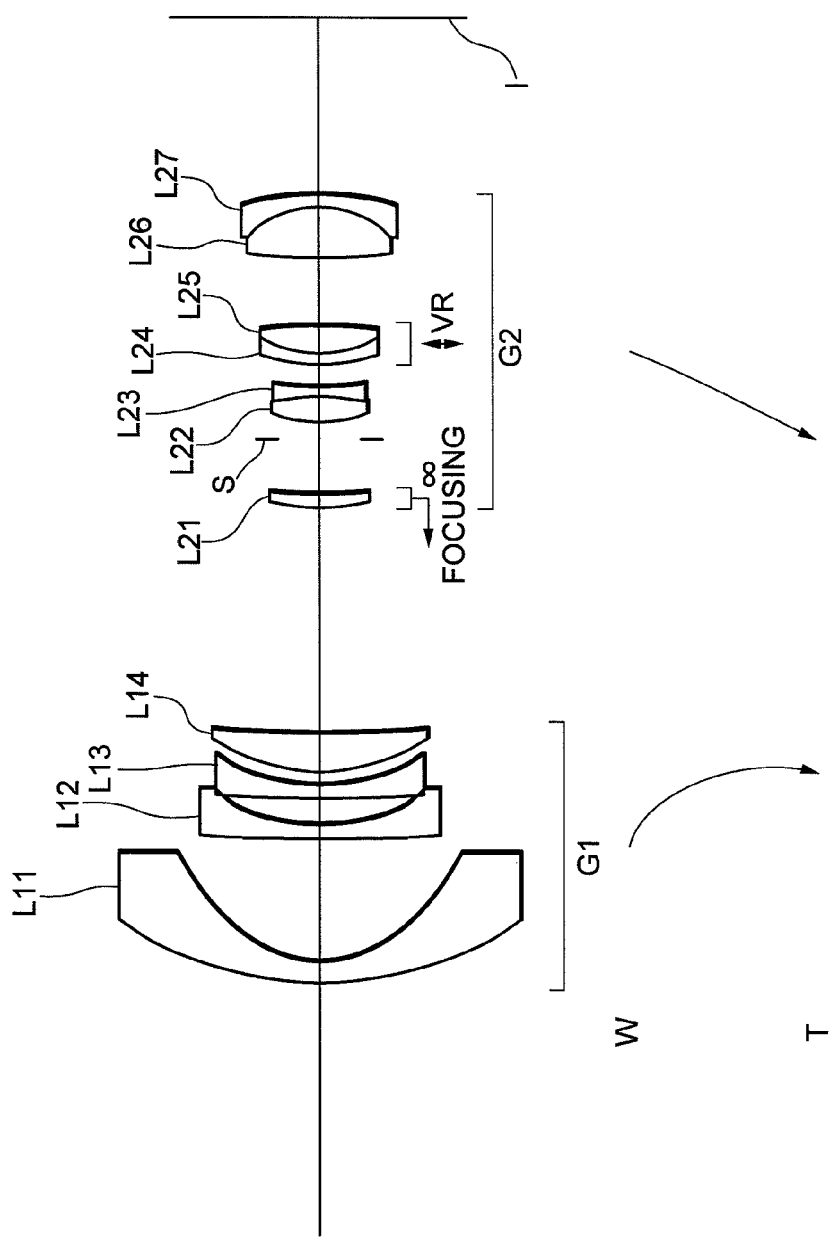

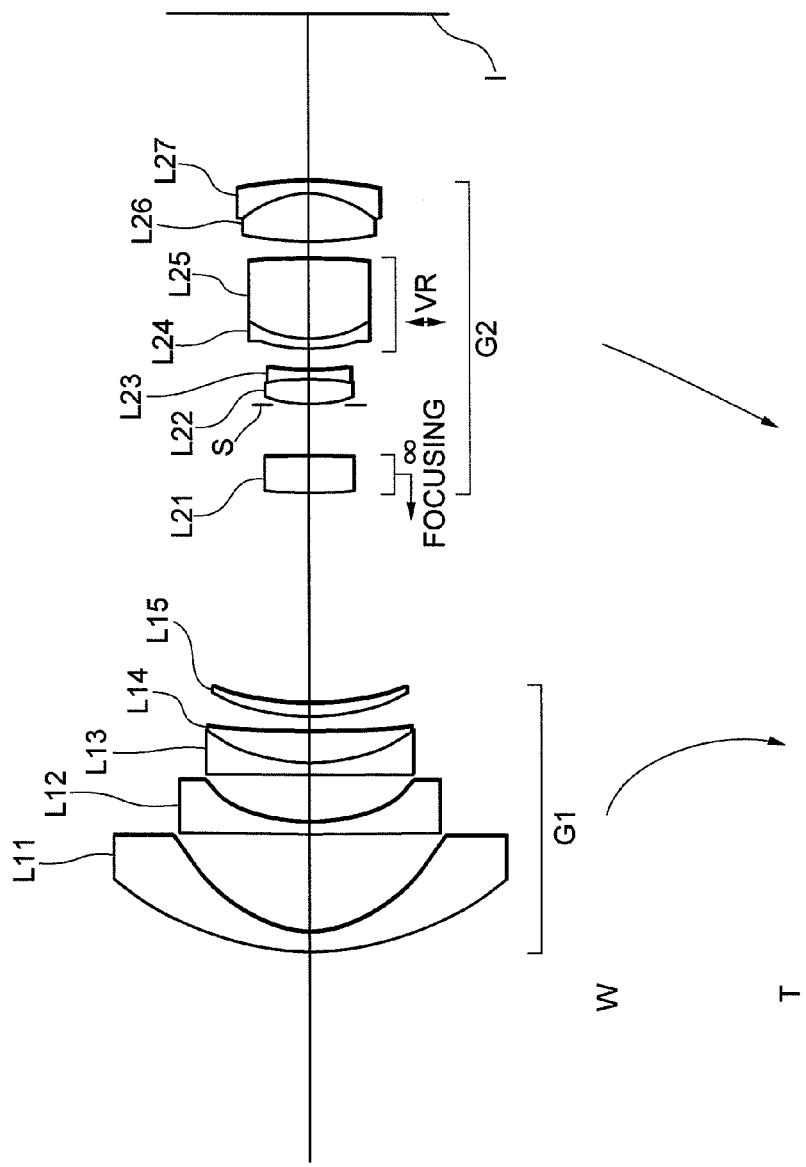

ZOOM LENS, OPTICAL APPARATUS AND METHOD FOR MANUFACTURING ZOOM LENS

The disclosure of the following priority applications is herein incorporated by reference:

Japanese Patent Application No. 2011-038968 filed on Feb. 24, 2011.

BACKGROUND OF THE INVENTION

1. Field of the Invention

The present invention relates to a zoom lens, an optical apparatus, and a method for manufacturing the zoom lens.

2. Related Background Art

There have been proposed a lot of zoom lenses consisting of, in order from an object side, a first lens group having negative refractive power and a second lens group having positive refractive power (for example, see Japanese Patent Application Laid-Open Nos. 2005-062770 and 2001-330774). However, in the conventional zoom lenses, there have been problems that optical performance is not good enough particularly in the wide-angle side, and the dimension thereof is not small enough. On the other hand, in order to increase optical performance, the zoom lens has to be large and heavy, or the zoom lens has to use an aspherical lens which cannot be produced on a mass-production basis. Accompany with the recent digitization of an optical apparatus such as a camera, a zoom lens is required to have excellent optical performance and to be compact and lightweight.

SUMMARY OF THE INVENTION

The present invention is made in view of the above-described problem, and has an object to provide a zoom lens being compact and light having high resolution and excellent optical performance, an optical apparatus, and a method for manufacturing the zoom lens.

According to a first aspect of the present invention, there is provided a zoom lens comprising, in order from an object side: a first lens group having negative refractive power; and a second lens group having positive refractive power, the first lens group including, in order from the object side, a first negative meniscus lens having a convex surface facing the object side, a negative lens, a second negative meniscus lens having a convex surface facing the object side, and a positive lens, a distance between the first lens group and the second lens group being varied thereby carrying out zooming, and the following conditional expressions (1) and (2) being satisfied:

$$-3.00 < (R12+R11)/(R12-R11) < -1.50 \quad (1)$$

$$-2.50 < (R22+R21)/(R22-R21) < 0.00 \quad (2)$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens.

According to a second aspect of the present invention, there is provided a zoom lens comprising, in order from an object side: a first lens group having negative refractive power; and a second lens group having positive refractive power, the first lens group including, in order from the object side, a first negative meniscus lens having a convex surface facing the object side, a negative lens, a second negative meniscus lens having a convex surface facing the object side, and a positive lens, the second negative meniscus lens being cemented with the positive lens, a distance between the first lens group and the second lens group being varied thereby carrying out zooming, and the following conditional expression (3) being satisfied:

$$0.00 < (-fa)/fb \quad (3)$$

where fa denotes a combined focal length of the first negative meniscus lens, the negative lens, the second negative meniscus lens, and the positive lens, and fb denotes a combined focal length of the second negative meniscus lens and the positive lens.

According to a third aspect of the present invention, there is provided a zoom lens comprising, in order from an object side: a first lens group having negative refractive power; and a second lens group having positive refractive power, the second lens group including a vibration reduction lens group that moves in a direction including a component perpendicular to an optical axis, a distance between the first lens group and the second lens group being varied thereby carrying out zooming, and the following conditional expression (5) being satisfied:

$$0.10 < f2/fvr < 2.00 \quad (5)$$

where f2 denotes a focal length of the second lens group, and fvr denotes a focal length of the vibration reduction lens group.

According to a fourth aspect of the present invention, there is provided an optical apparatus equipped with the zoom lens according to the first aspect of the present invention.

According to a fifth aspect of the present invention, there is provided a method for manufacturing a zoom lens including, in order from an object side, a first lens group having negative refractive power, and a second lens group having positive refractive power, the method comprising steps of: disposing, in order from the object side, a first negative meniscus lens having a convex surface facing the object side, a negative lens, a second negative meniscus lens having a convex surface facing the object side, and a positive lens into the first lens group; disposing the first lens group with satisfying the following conditional expressions (1) and (2):

$$-3.00 < (R12+R11)/(R12-R11) < -1.50 \quad (1)$$

$$-2.50 < (R22+R21)/(R22-R21) < 0.00 \quad (2)$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens; and disposing the first lens group and the second lens group movably such that a distance between the first lens group and the second lens group becomes variable, thereby enabling zooming.

According to a sixth aspect of the present invention, there is provided a method for manufacturing a zoom lens including, in order from an object side, a first lens group having negative refractive power, and a second lens group having positive refractive power, the method comprising steps of: disposing, in order from the object side, a first negative meniscus lens having a convex surface facing the object side, a negative lens, a second negative meniscus lens having a convex surface facing the object side, and a positive lens into the first lens group; cementing the second negative meniscus lens with the positive lens; disposing the first lens group with satisfying following conditional expression (3):

$$0.00 < (-fa)/fb \qquad (3)$$

where fa denotes a combined focal length of the first negative meniscus lens, the negative lens, the second negative meniscus lens, and the positive lens, and fb denotes a combined focal length of the second negative meniscus lens and the positive lens; and disposing the first lens group and the second lens group movably such that a distance between the first lens group and the second lens group becomes variable, thereby enabling zooming.

According to a seventh aspect of the present invention, there is provided a method for manufacturing a zoom lens including, in order from an object side, a first lens group having negative refractive power, and a second lens group having positive refractive power, the method comprising steps of: disposing a vibration reduction lens group moving in a direction including a component perpendicular to an optical axis into the second lens group; disposing the second lens group with satisfying the following conditional expression (5):

$$0.10 < f2/fvr < 2.00 \qquad (5)$$

where f2 denotes a focal length of the second lens group, and fvr denotes a focal length of the vibration reduction lens group; and disposing the first lens group and the second lens group movably such that a distance between the first lens group and the second lens group becomes variable, thereby enabling zooming.

The present invention makes it possible to provide a zoom lens being compact and light having high resolution and excellent optical performance, an optical apparatus, and a method for manufacturing the zoom lens.

BRIEF DESCRIPTION OF THE DRAWINGS

FIG. 1 is a sectional view showing a lens configuration of a zoom lens according to Example 1 of the present application.

FIGS. 2A, and 2B are graphs showing various aberrations of the zoom lens according to Example 1 of the present application in a wide-angle end state focusing on an infinitely distant object, in which FIG. 2A shows various aberrations, and FIG. 2B shows coma upon carrying out vibration reduction.

FIGS. 3A, and 3B are graphs showing various aberrations of the zoom lens according to Example 1 of the present application in a telephoto end state focusing on an infinitely distant object, in which FIG. 3A shows various aberrations, and FIG. 3B shows coma upon carrying out vibration reduction.

FIG. 4 is a sectional view showing a lens configuration of a zoom lens according to Example 2 of the present application.

FIGS. 5A, and 5B are graphs showing various aberrations of the zoom lens according to Example 2 of the present application in a wide-angle end state focusing on an infinitely distant object, in which FIG. 5A shows various aberrations, and FIG. 5B shows coma upon carrying out vibration reduction.

FIGS. 6A, and 6B are graphs showing various aberrations of the zoom lens according to Example 2 of the present application in a telephoto end state focusing on an infinitely distant object, in which FIG. 6A shows various aberrations, and FIG. 6B shows coma upon carrying out vibration reduction.

FIG. 7 is a sectional view showing a lens configuration of a zoom lens according to Example 3 of the present application.

FIGS. 8A, and 8B are graphs showing various aberrations of the zoom lens according to Example 3 of the present application in a wide-angle end state focusing on an infinitely distant object, in which FIG. 8A shows various aberrations, and FIG. 8B shows coma upon carrying out vibration reduction.

FIGS. 9A, and 9B are graphs showing various aberrations of the zoom lens according to Example 3 of the present application in a telephoto end state focusing on an infinitely distant object, in which FIG. 9A shows various aberrations, and FIG. 9B shows coma upon carrying out vibration reduction.

FIGS. 11A, and 11B are graphs showing various aberrations of the zoom lens according to Example 4 of the present application in a wide-angle end state focusing on an infinitely distant object, in which FIG. 11A shows various aberrations, and FIG. 11B shows coma upon carrying out vibration reduction.

FIGS. 12A, and 12B are graphs showing various aberrations of the zoom lens according to Example 4 of the present application in a telephoto end state focusing on an infinitely distant object, in which FIG. 12A shows various aberrations, and FIG. 12B shows coma upon carrying out vibration reduction.

FIG. 13 is a sectional view showing a lens configuration of a zoom lens according to Example 5 of the present application.

FIGS. 14A, and 14B are graphs showing various aberrations of, the zoom lens according to Example 5 of the present application in a wide-angle end state focusing on an infinitely distant object, in which FIG. 14A shows various aberrations, and FIG. 14B shows coma upon carrying out vibration reduction.

FIGS. 15A, and 15B are graphs showing various aberrations of the zoom lens according to Example 5 of the present application in a telephoto end state focusing on an infinitely distant object, in which FIG. 15A shows various aberrations, and FIG. 15B shows coma upon carrying out vibration reduction.

DESCRIPTION OF THE MOST PREFERRED EMBODIMENT

Figure 3A:
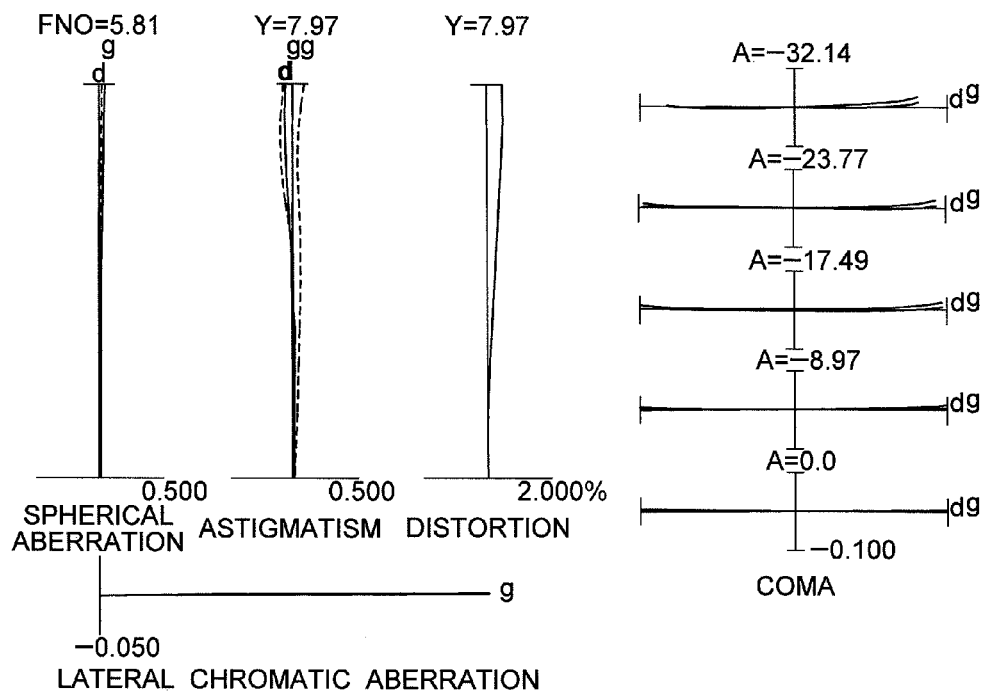

A zoom lens, an optical apparatus, and a method for manufacturing the zoom lens according to the present application are explained below.

A zoom lens according to the present application consists of, in order from an object side, a first lens group having negative refractive power and a second lens group having positive refractive power. The first lens group includes, in order from the object side, a first negative meniscus lens having a convex surface facing the object side, a negative lens, a second negative meniscus lens having a convex surface facing the object side, and a positive lens. A distance between the first lens group and the second lens group is variable so as to carrying out zooming. The following conditional expressions (1) and (2) are satisfied:

$$-3.00 < (R12+R11)/(R12-R11) < -1.50 \quad (1)$$

$$-2.50 < (R22+R21)/(R22-R21) < 0.00 \quad (2)$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens.

As described above, in a zoom lens according to the present application, the first lens group includes, in order from the object side, the first negative lens having the convex surface facing the object side, the negative lens, the second negative meniscus lens having the convex surface facing the object side, and the positive lens. With this configuration, it becomes possible to realize excellent optical performance with accomplishing the angle of view wider.

Conditional expression (1) defines an optimum shape of the first negative meniscus lens in the first lens group. With satisfying conditional expression (1), a zoom lens according to the present application makes it possible to realize a wider angle of view with excellently correcting curvature of field, coma and distortion.

When the value of conditional expression (1) is equal to or exceeds the upper limit of conditional expression (1), refractive power of the first negative meniscus lens becomes large. Accordingly, in a zoom lens according to the present application, it becomes impossible to excellently correct, in particular, curvature of field, coma and distortion. In order to secure the effect of the present application, it is preferable to set the upper limit of conditional expression (1) to −1.60.

On the other hand, when the value of conditional expression (1) is equal to or falls below the lower limit of conditional expression (1), refractive power of the first negative meniscus lens becomes excessively small. As a result, in a zoom lens according to the present application, it becomes impossible to excellently correct, in particular, curvature of field, coma and distortion. Moreover, in a zoom lens according to the present application, it becomes difficult to realize a wider angle of view. In order to secure the effect of the present application, it is preferable to set the lower limit of conditional expression (1) to −2.50.

Conditional expression (2) defines an optimum shape of the negative lens in the first lens group. With satisfying conditional expression (2), a zoom lens according to the present application makes it possible to realize a wider angle of view with excellently correcting curvature of field, coma and distortion.

When the value of conditional expression (2) is equal to or exceeds the upper limit of conditional expression (2), refractive power of the negative lens becomes large. Accordingly, in a zoom lens according to the present application, it becomes impossible to excellently correct, in particular, curvature of field, coma and distortion.

On the other hand, when the value of conditional expression (2) is equal to or falls below the lower limit of conditional expression (2), refractive power of the negative lens becomes excessively small. As a result, in a zoom lens according to the present application, it becomes impossible to excellently correct, in particular, curvature of field, coma and distortion. Moreover, in a zoom lens according to the present application, it becomes difficult to realize a wider angle of view. In order to secure the effect of the present application, it is preferable to set the lower limit of conditional expression (2) to −2.00. In order to further secure the effect of the present application, it is most preferable to set the lower limit of conditional expression (2) to −1.50.

With this configuration, it becomes possible to realize a zoom lens being compact and lightweight having high resolution and excellent optical performance.

In a zoom lens according to the present application, the second negative meniscus lens is preferably cemented with the positive lens. With this configuration, it becomes possible to excellently correct coma and lateral chromatic aberration.

In a zoom lens according to the present application, the following conditional expression (3) is preferably satisfied:

$$0.00 < (-fa)/fb \quad (3)$$

where fa denotes a combined focal length of the first negative meniscus lens, the negative lens, the second negative meniscus lens, and the positive lens, and fb denotes a combined focal length of the second negative meniscus lens and the positive lens.

Conditional expression (3) is a relation between the combined focal length of the first negative meniscus lens, the negative lens, the second negative meniscus lens, and the positive lens and the combined focal length of the second negative meniscus lens and the positive lens in the first lens group, and defines optimum refractive power distribution in the first lens group. With satisfying conditional expression (3), a zoom lens according to the present application makes it possible to excellently correct, in particular, curvature of field and coma in the wide-angle side.

When the value of conditional expression (3) is equal to or falls below the lower limit of conditional expression (3), the combined refractive power of the second negative meniscus lens and the positive lens becomes negative. Accordingly, in a zoom lens according to the present application, it becomes difficult to excellently correct, in particular, curvature of field and coma in the wide-angle side.

In a zoom lens according to the present application, the following conditional expression (4) is preferably satisfied:

$$0.40 < fw/(-fa) < 0.70 \quad (4)$$

where fw denotes a focal length of the zoom lens in the wide-angle end state, and fa denotes a combined focal length of the first negative meniscus lens, the negative lens, the second negative meniscus lens, and the positive lens.

Conditional expression (4) is a relation between the focal length of the zoom lens in the wide-angle end state and the combined focal length of the first negative meniscus lens, the negative lens, the second negative meniscus lens, and the positive lens in the first lens group, and defines optimum power distribution of the whole of a zoom lens according to the present application. With satisfying conditional expression (4), it becomes possible to excellently correct coma, sagittal coma, curvature of field and spherical aberration.

When the value of conditional expression (4) is equal to or exceeds the upper limit of conditional expression (4), combined refractive power of the first negative meniscus lens, the negative lens, the second negative meniscus lens, and the positive lens becomes relatively strong with respect to the focal length of the zoom lens according to the present application. As a result, correction of off-axis ray becomes excessive, and, in particular, coma, sagittal coma and curvature of field become worse, so that it is undesirable.

On the other hand, when the value of conditional expression (4) is equal to or falls below the lower limit of conditional expression (4), combined refractive power of the first negative meniscus lens, the negative lens, the second negative meniscus lens, and the positive lens becomes relatively weak with respect to the focal length of the zoom lens according to the present application. As a result, correction of off-axis ray becomes insufficient, and, in particular, sagittal coma becomes worse. Moreover, insufficient refractive power is forcibly corrected by the second lens group, so that spherical aberration becomes worse. In order to secure the effect of the present application, it is preferable to set the lower limit of conditional expression (4) to 0.50.

A zoom lens seen from another point of view according to the present application consists of, in order from an object side, a first lens group having negative refractive power, and a second lens group having positive refractive power. The first lens group includes, in order from the object side, a first negative meniscus lens having a convex surface facing the object side, a negative lens, a second negative meniscus lens having a convex surface facing the object side, and a positive lens. The second negative meniscus lens is cemented with the positive lens. A distance between the first lens group and the second lens group is variable so as to carrying out zooming. The following conditional expression (3) is satisfied:

$$0.00 < (-fa)/fb \tag{3}$$

where fa denotes a combined focal length of the first negative meniscus lens, the negative lens, the second negative meniscus lens, and the positive lens, and fb denotes a combined focal length of the second negative meniscus lens and the positive lens.

With this configuration, it becomes possible to realize a zoom lens being compact and lightweight having high resolution and excellent optical performance.

In a zoom lens seen from another point of view according to the present application, the first lens group preferably includes at least one aspherical lens. With this configuration, a zoom lens seen from another point of view according to the present application makes it possible to realize higher resolution.

In a zoom lens seen from another point of view according to the present application, at least one lens in the second lens group is preferably movable so as to carry out focusing. With this configuration, a zoom lens seen from another point of view according to the present application makes it possible to obtain excellent image upon focusing on a close range object.

In a zoom lens seen from another point of view according to the present application, at least one lens in the second lens group is preferably movable in a direction including a component perpendicular to an optical axis. With this configuration, a zoom lens seen from another point of view according to the present application makes it possible to excellently correct an image blur caused by a camera shake.

A zoom lens seen from still another point of view according to the present application consists of, in order from an object side, a first lens group having negative refractive power, and a second lens group having positive refractive power. The second lens group includes a vibration reduction lens group that is movable in a direction including a component perpendicular to an optical axis. A distance between the first lens group and the second lens group is movable so as to carrying out zooming. The following conditional expression (5) is satisfied:

$$0.10 < f2/fvr < 2.00 \tag{5}$$

where f2 denotes a focal length of the second lens group, and fvr denotes a focal length of the vibration reduction lens group.

In a zoom lens seen from still another point of view according to the present application, the vibration reduction lens group is movable in a direction including a component perpendicular to the optical axis, in other words, shifts or tilts, so that an image blur caused by a camera shake can be excellently corrected.

Conditional expression (5) is an optimum relation between the focal length of the second lens group and the focal length of the vibration reduction lens group. With satisfying conditional expression (5), a zoom lens seen from still another point of view according to the present application can be compact and lightweight with excellently correcting coma, decentering coma, and curvature of field.

When the value of conditional expression (5) is equal to or exceeds the upper limit of conditional expression (5), refractive power of the vibration reduction lens group becomes relatively strong. Accordingly, it becomes difficult to excellently correct coma and decentering coma. In order to secure the effect of the present application, it is preferable to set the upper limit of conditional expression (5) to 1.00. In order to further secure the effect of the present application, it is most preferable to set the upper limit of conditional expression (5) to 0.70.

On the other hand, when the value of conditional expression (5) is equal to or falls below the lower limit of conditional expression (5), refractive power of the vibration reduction lens group becomes relatively small. Accordingly, it becomes difficult to excellently correct curvature of field and coma. Moreover, a shift amount or a tilt amount of the vibration reduction lens group for obtaining a desired image-shift amount becomes large, so that a zoom lens seen from still another point of view according to the present application becomes large. In order to secure the effect of the present application, it is preferable to set the lower limit of conditional expression (5) to 0.20. In order to further secure the effect of the present application, it is most preferable to set the lower limit of conditional expression (5) to 0.30.

With this configuration described above, it becomes possible to realize a zoom lens being compact and lightweight having high resolution and excellent optical performance.

An optical apparatus according to the present application is characterized by being equipped with the zoom lens having the above-described configuration. With this construction, it becomes possible to realize an optical apparatus being compact and lightweight having high resolution and excellent optical performance.

A method for manufacturing a zoom lens according to the present application is a method for manufacturing a zoom lens consisting of, in order from an object side, a first lens group having negative refractive power, and a second lens group having positive refractive power, the method comprising steps of:

disposing, in order from the object side, a first negative meniscus lens having a convex surface facing the object side, a negative lens, a second negative meniscus lens having a convex surface facing the object side, and a positive lens into the first lens group;

disposing the first lens group with satisfying conditional expressions (1) and (2):

$$-3.00 < (R12+R11)/(R12-R11) < -1.50 \tag{1}$$

$$-2.50 < (R22+R21)/(R22-R21) < 0.00 \tag{2}$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens; and disposing the first lens group and the second lens group movably such that a distance between the first lens group and the second lens group becomes variable, thereby enabling zooming.

With this method, it becomes possible to manufacture a zoom lens being compact and lightweight having high resolution and excellent optical performance.

A method for manufacturing a zoom lens seen from another point of view according to the present application is a method for manufacturing a zoom lens consisting of, in order from an object side, a first lens group having negative refractive power, and a second lens group having positive refractive power, the method comprising steps of:

disposing, in order from the object side, a first negative meniscus lens having a convex surface facing the object side, a negative lens, a second negative meniscus lens having a convex surface facing the object side, and a positive lens into the first lens group;

cementing the second negative meniscus lens with the positive lens;

disposing the first lens group with satisfying conditional expression (3):

$$0.00 < (-fa)/fb \quad (3)$$

where fa denotes a combined focal length of the first negative meniscus lens, the negative lens, the second negative meniscus lens, and the positive lens, and fb denotes a combined focal length of the second negative meniscus lens and the positive lens; and disposing the first lens group and the second lens group movably such that a distance between the first lens group and the second lens group becomes variable, thereby enabling zooming.

With this method, it becomes possible to manufacture a zoom lens being compact and lightweight having high resolution and excellent optical performance.

A method for manufacturing a zoom lens seen from still another point of view according to the present application is a method for manufacturing a zoom lens consisting of, in order from an object side, a first lens group having negative refractive power, and a second lens group having positive refractive power, the method comprising steps of:

disposing a vibration reduction lens group moving in a direction including a component perpendicular to an optical axis into the second lens group;

disposing the second lens group with satisfying conditional expression (5):

$$0.10 < f2/fvr < 2.00 \quad (5)$$

where f2 denotes a focal length of the second lens group, and fvr denotes a focal length of the vibration reduction lens group; and disposing the first lens group and the second lens group movably such that a distance between the first lens group and the second lens group becomes variable, thereby enabling zooming.

With this method, it becomes possible to manufacture a zoom lens being compact and lightweight having high resolution and excellent optical performance.

Each numerical example of a zoom lens according to the present application is explained below with reference to accompanying drawings.

EXAMPLE 1

FIG. 1 is a sectional view showing a lens configuration of a zoom lens according to Example 1 of the present application together with a moving trajectory of each lens group.

The zoom lens according to Example 1 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a negative meniscus lens L12 having a convex surface facing the object side, and a cemented lens constructed by a negative meniscus lens L13 having a convex surface facing the object side cemented with a positive meniscus lens L14 having a convex surface facing the object side.

The second lens group G2 is composed of, in order from the object side, a positive meniscus lens L21 having a convex surface facing the object side, an aperture stop S, a cemented lens constructed by a double convex positive lens L22 cemented with a double concave negative lens L23, a cemented lens constructed by a negative meniscus lens L24 having a convex surface facing the object side cemented with a double convex positive lens L25, and a cemented lens constructed by a double convex positive lens L26 cemented with a negative meniscus lens L27 having a concave surface facing the object side.

With this configuration, in the zoom lens according to Example 1, the first lens group G1 and the second lens group G2 are moved along an optical axis such that a distance between the first lens group G1 and the second lens group G2 decreases, thereby carrying out zooming from a wide-angle end state to a telephoto end state.

Moreover, in the zoom lens according to Example 1, only the positive meniscus lens L21 in the second lens group G2 is moved toward the object side along the optical axis, thereby carrying out focusing from an infinitely distant object to a close object. Incidentally, the zoom lens according to Example 1 can focus up to a shooting range of 200 mm.

Moreover, in the zoom lens according to Example 1, upon generating a camera shake, only the cemented lens constructed by the negative meniscus lens L24 cemented with the positive lens L25 is moved as a vibration reduction lens group in a direction including a component perpendicular to the optical axis, thereby carrying out vibration reduction.

Various values associated with the zoom lens according to Example 1 are listed in Table 1. In (Specifications) in Table 1, W denotes a wide-angle end state, M denotes an intermediate focal length state, T denotes a telephoto end state, f denotes a focal length of the zoom lens, FNO denotes an f-number, 2ω denotes an angle of view (unit: degree), Y denotes an image height, TL denotes a total lens length that is a distance between the first plane and the image plane I, BF denotes a back focal length, β denotes shooting magnification, and RA denotes a shooting range that is a distance between the object plane and the image plane I. In (Lens Surface Data), "OP" denotes an object plane, "I" denotes an image plane, the left most column "m" shows the lens surface number counted in order from the object side, the second column "r" shows a radius of curvature of the lens surface, the third column "d" shows a distance to the next optical surface, the fourth column "nd" shows a refractive index at d-line (wavelength λ=587.6 nm), and the fifth column "vd" shows an Abbe number at d-line (wavelength λ=587.6 nm). In (Lens Surface Data), r=∞ indicates a plane surface. In third column "d", BF denotes a back focal length. Each aspherical surface is expressed in (Lens Data) by attaching "*" to the left side of the surface number and a paraxial radius of curvature is shown in the column "r".

In (Aspherical Surface Date), an aspherical surface is expressed by the following expression:

$$S(y) = (y^2/R)/(1 + (1 - \kappa(y^2/R^2))^{1/2}) + A4 \times y^4 + A6 \times y^6 + A8 \times y^8 + A10 \times y^{10}$$

where "y" denotes a vertical height from the optical axis, S(y) denotes a sag amount which is a distance along the optical axis from the tangent surface at the vertex of the aspherical surface to the aspherical surface at the vertical height y from the optical axis, R denotes a radius of curvature of a reference sphere (paraxial radius of curvature), κ denotes a conical coefficient, and An denotes an aspherical coefficient of n-th order. In (Aspherical Surface Data), "E-n" denotes "×10$^{-n}$", in which "n" is an integer, and for example "1.234E-05" denotes "1.234×10$^{-5}$". Aspherical coefficient A2 of the second order is zero.

In (Lens Group Data), a starting surface number "ST" and a focal length of each lens group are shown.

In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

(Specifications)

Zoom Ratio = 1.83

|  | W | M | T |
|---|---|---|---|
| f = | 6.9 | 9.5 | 12.6 |
| FNO = | 3.6 | 4.5 | 5.8 |
| 2ω = | 100.5 | 79.9 | 64.3 |
| Y = | 7.95 | 7.95 | 7.95 |
| TL = | 84.18 | 70.5 | 77.69 |
| BF = | 13.75 | 17.72 | 22.37 |

(Lens Surface Data)

| m | r | d | nd | vd |
|---|---|---|---|---|
| OP | ∞ | | | |
| 1 | 28.0000 | 1.6000 | 1.693501 | 53.20 |
| *2 | 8.7212 | 8.5000 | 1.000000 | |
| 3 | 200.0000 | 1.0000 | 1.773770 | 47.26 |
| *4 | 15.2455 | 4.9250 | 1.000000 | |
| 5 | 55.1429 | 1.0000 | 1.497820 | 82.51 |
| 6 | 12.5779 | 3.2623 | 1.834000 | 37.16 |
| 7 | 52.4625 | (d7) | 1.000000 | |
| 8 | 24.6817 | 1.2000 | 1.581440 | 40.95 |
| 9 | 440.2055 | (d9) | 1.000000 | |
| 10 | ∞ | 1.0000 | 1.000000 | Aperture Stop S |
| 11 | 11.2454 | 2.0000 | 1.497820 | 82.56 |
| 12 | −21.2724 | 0.8000 | 1.744000 | 44.82 |
| 13 | 24.8416 | 1.5000 | 1.000000 | |

TABLE 1-continued (Specifications)

| 14 | 15.1047 | 0.8000 | 1.719995 | 50.23 |
|---|---|---|---|---|
| 15 | 8.4328 | 2.3031 | 1.497820 | 82.56 |
| 16 | −56.9377 | 5.3000 | 1.000000 | |
| 17 | 34.2651 | 4.0000 | 1.497820 | 82.56 |
| 18 | −8.6697 | 1.0000 | 1.773770 | 47.26 |
| *19 | −28.5871 | BF | 1.000000 | |
| I | ∞ | | | |

(Aspherical Surface Data)

Surface Number: 2

κ = −0.6939
A4 = 1.87450E−04
A6 = −7.97892E−07
A8 = 8.73931E−09
A10 = −4.94201E−11

Surface Number: 4

κ = −6.8231
A4 = 3.35058E−04
A6 = −2.39539E−06
A8 = 2.38579E−08
A10 = −4.33031E−11

Surface Number: 19

κ = −6.8154
A4 = 4.24510E−05
A6 = −4.63286E−07
A8 = 1.76308E−08
A10 = −1.79833E−10

(Variable Distances)

|  | W | M | T |
|---|---|---|---|

<upon focusing on a infinitely distant object>

| f = | 6.9 | 9.5 | 12.6 |
|---|---|---|---|
| d0 = | ∞ | ∞ | ∞ |
| d7 = | 17.61 | 8.39 | 2.50 |
| d9 = | 4.21 | 4.21 | 4.21 |
| BF = | 13.75 | 17.72 | 22.37 |

<upon shooting magnification β of −0.01>

| β = | −0.01 | −0.01 | −0.01 |
|---|---|---|---|
| d0 = | 668.25 | 932.28 | 1240.60 |
| d7 = | 17.83 | 8.56 | 2.64 |
| d9 = | 3.99 | 4.04 | 4.07 |
| BF = | 13.75 | 17.72 | 22.37 |

<upon shooting range RA of 200 mm>

| RA = | 200 | 200 | 200 |
|---|---|---|---|
| d0 = | 115.82 | 121.07 | 122.31 |
| d7 = | 18.72 | 9.51 | 3.70 |
| d9 = | 3.10 | 3.09 | 3.01 |
| BF = | 13.77 | 17.76 | 22.42 |

(Lens Group Data)

| Group | ST | Focal Length |
|---|---|---|
| 1 | 1 | −12.35 |
| 2 | 8 | 18.60 |

(Values for Conditional Expressions)

(1): (R12 + R11)/(R12 − R11) = −1.90
(2): (R22 + R21)/(R22 − R21) = −1.17
(3): (−fa)/fb = 0.26
(4): fw/(−fa) = 0.56
(5): f2/fvr = 0.56

FIGS. 2A, and 2B are graphs showing various aberrations of the zoom lens according to Example 1 of the present application in a wide-angle end state focusing on an infinitely distant object, in which FIG. 2A shows various aberrations, and FIG. 2B shows coma upon carrying out vibration reduction.

Figure 3B:
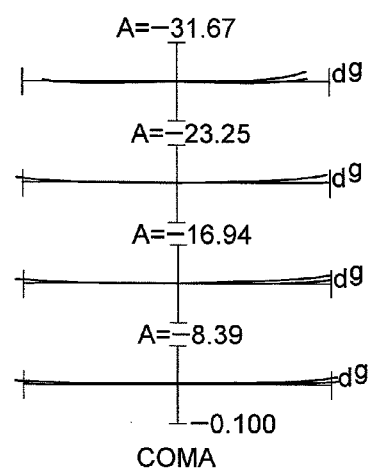

FIGS. 3A, and 3B are graphs showing various aberrations of the zoom lens according to Example 1 of the present application in a telephoto end state focusing on an infinitely distant object, in which FIG. 3A shows various aberrations, and FIG. 3B shows coma upon carrying out vibration reduction.

In respective graphs, FNO denotes an f-number, Y denotes an image height, A denotes a half angle of view (unit: degree), d indicates an aberration curve at d-line (wavelength λ=587.6 nm), and g indicates an aberration curve at g-line (wavelength λ=435.8 nm). In graphs showing astigmatism, a solid line indicates a sagittal image plane, and a broken line indicates a meridional image plane. The above-described explanations regarding various aberration graphs are the same as the other Examples.

As is apparent from the respective graphs, the zoom lens according to Example 1 shows superb optical performance as a result of good corrections to various aberrations in each focal length state from the wide-angle end state through the telephoto end state, even upon carrying out vibration reduction.

EXAMPLE 2

FIG. 4 is a sectional view showing a lens configuration of a zoom lens according to Example 2 of the present application together with a moving trajectory of each lens group.

The zoom lens according to Example 2 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a negative meniscus lens L12 having a convex surface facing the object side, and a cemented lens constructed by a negative meniscus lens L13 having a convex surface facing the object side cemented with a positive meniscus lens L14 having a convex surface facing the object side.

The second lens group G2 is composed of, in order from the object side, a positive meniscus lens L21 having a convex surface facing the object side, an aperture stop S, a cemented lens constructed by a double convex positive lens L22 cemented with a negative meniscus lens L23 having a concave surface facing the object side, a cemented lens constructed by a double convex positive lens L24 cemented with a negative meniscus lens L25 having a concave surface facing the object side, and a cemented lens constructed by a negative meniscus lens L26 having a convex surface facing the object side cemented with a double convex positive lens L27.

With this configuration, in the zoom lens according to Example 2, the first lens group G1 and the second lens group G2 are moved along an optical axis such that a distance between the first lens group G1 and the second lens group G2 decreases, thereby carrying out zooming from a wide-angle end state to a telephoto end state.

Moreover, in the zoom lens according to Example 2, only the positive meniscus lens L21 in the second lens group G2 is moved toward the object side along the optical axis, thereby carrying out focusing from an infinitely distant object to a close object. Incidentally, the zoom lens according to Example 2 can focus up to a shooting range of 200 mm.

Moreover, in the zoom lens according to Example 2, upon generating a camera shake, only the cemented lens constructed by the positive lens L24 cemented with the negative meniscus lens L25 is moved as a vibration reduction lens group in a direction including a component perpendicular to the optical axis, thereby carrying out vibration reduction.

Various values associated with the zoom lens according to Example 2 are listed in Table 2.

TABLE 2

(Specifications)

Zoom Ratio = 1.83

| | W | M | T |
|---|---|---|---|
| f = | 6.9 | 9.5 | 12.6 |
| FNO = | 3.6 | 4.5 | 5.8 |
| 2ω = | 100.3 | 79.6 | 64.0 |
| Y = | 7.95 | 7.95 | 7.95 |
| TL = | 84.55 | 71.00 | 78.31 |
| BF = | 13.75 | 17.87 | 22.67 |

(Lens Surface Data)

| m | r | d | nd | νd |
|---|---|---|---|---|
| OP | ∞ | | | |
| 1 | 28.0000 | 1.6000 | 1.693501 | 53.20 |
| *2 | 8.6657 | 8.5000 | 1.000000 | |
| 3 | 200.0000 | 1.0000 | 1.773770 | 47.26 |
| *4 | 15.4086 | 5.3617 | 1.000000 | |
| 5 | 50.2686 | 1.0000 | 1.497820 | 82.51 |
| 6 | 12.9745 | 3.1234 | 1.834000 | 37.16 |
| 7 | 48.8592 | (d7) | 1.000000 | |
| 8 | 10.7432 | 1.2000 | 1.581440 | 40.95 |
| 9 | 18.1159 | (d9) | 1.000000 | |
| 10 | ∞ | 1.0000 | 1.000000 | Aperture Stop S |
| 11 | 19.2017 | 2.0000 | 1.497820 | 82.56 |
| 12 | −12.7503 | 0.8000 | 1.744000 | 44.82 |
| 13 | −115.2978 | 1.5000 | 1.000000 | |
| 14 | 17.2461 | 2.3597 | 1.497820 | 82.56 |
| 15 | −9.1207 | 0.8000 | 1.719995 | 50.23 |
| 16 | −32.7902 | 5.2972 | 1.000000 | |
| *17 | 80.8914 | 1.0000 | 1.773770 | 47.26 |
| 18 | 11.5205 | 4.0000 | 1.497820 | 82.56 |
| 19 | −26.9694 | BF | 1.000000 | |
| I | ∞ | | | |

(Aspherical Surface Data)

Surface Number: 2

κ = −0.4266
A4 = 1.40036E−04
A6 = −4.94433E−07
A8 = 6.70780E−09
A10 = −4.23849E−11

Surface Number: 4

κ = −7.0504
A4 = 3.33815E−04
A6 = −2.30596E−06
A8 = 2.32236E−08
A10 = −4.68219E−11

Surface Number: 17

κ = −188.40
A4 = −7.11673E−05
A6 = 7.32974E−07
A8 = −4.46117E−08
A10 = 7.00463E−10

(Variable Distances)

| | W | M | T |
|---|---|---|---|

<upon focusing on a infinitely distant object>

| | | | |
|---|---|---|---|
| f = | 6.9 | 9.5 | 12.6 |
| d0 = | ∞ | ∞ | ∞ |

TABLE 2-continued (Specifications)

| | | | |
|---|---|---|---|
| d7 = | 17.66 | 8.41 | 2.50 |
| d9 = | 4.18 | 4.18 | 4.18 |
| BF = | 13.75 | 17.87 | 22.67 |

<upon shooting magnification β of −0.01>

| | | | |
|---|---|---|---|
| β = | −0.01 | −0.01 | −0.01 |
| d0 = | 668.33 | 932.40 | 1240.64 |
| d7 = | 17.87 | 8.57 | 2.63 |
| d9 = | 3.96 | 4.02 | 4.05 |
| BF = | 13.75 | 17.87 | 22.67 |

<upon shooting range RA of 200 mm>

| | | | |
|---|---|---|---|
| RA = | 200 | 200 | 200 |
| d0 = | 115.45 | 120.58 | 121.69 |
| d7 = | 18.74 | 9.49 | 3.66 |
| d9 = | 3.10 | 3.10 | 3.02 |
| BF = | 13.77 | 17.90 | 22.73 |

(Lens Group Data)

| Group | ST | Focal Length |
|---|---|---|
| 1 | 1 | −12.16 |
| 2 | 8 | 18.95 |

(Values for Conditional Expressions)

Figure 5A:
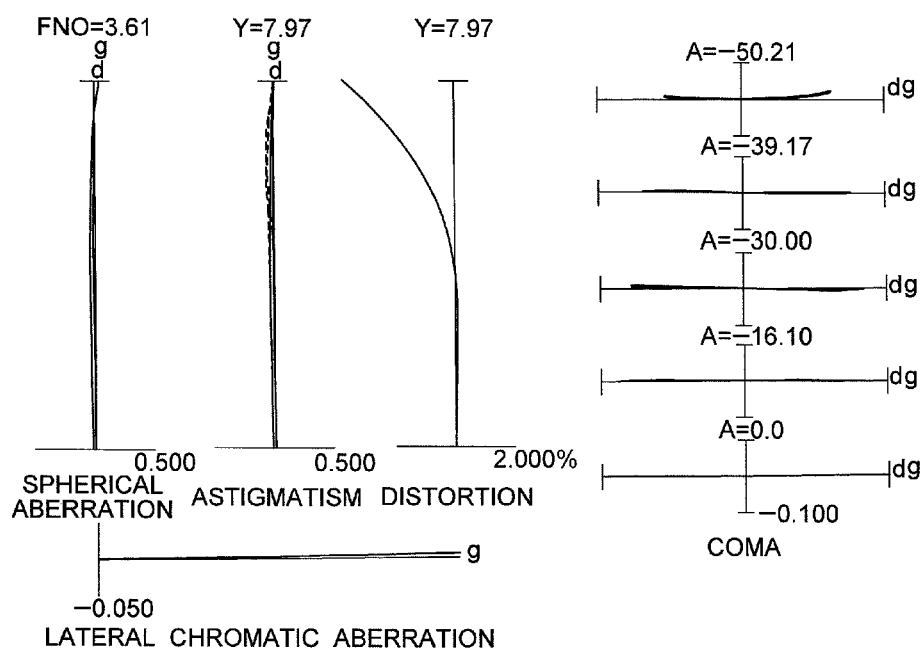
Figure 5B:
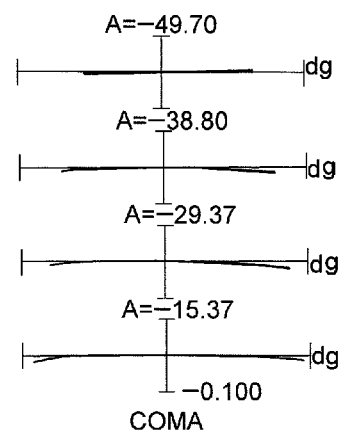

(1): $(R12 + R11)/(R12 − R11) = −1.90$
(2): $(R22 + R21)/(R22 − R21) = −1.17$
(3): $(−fa)/fb = 0.24$
(4): $fw/(−fa) = 0.57$
(5): $f2/fvr = 0.50$ FIGS. 5A, and 5B are graphs showing various aberrations of the zoom lens according to Example 2 of the present application in a wide-angle end state focusing on an infinitely distant object, in which FIG. 5A shows various aberrations, and FIG. 5B shows coma upon carrying out vibration reduction.

FIGS. 6A, and 6B are graphs showing various aberrations of the zoom lens according to Example 2 of the present application in a telephoto end state focusing on an infinitely distant object, in which FIG. 6A shows various aberrations, and FIG. 6B shows coma upon carrying out vibration reduction.

As is apparent from the respective graphs, the zoom lens according to Example 2 shows superb optical performance as a result of good corrections to various aberrations in each focal length state from the wide-angle end state through the telephoto end state, even upon carrying out vibration reduction.

EXAMPLE 3

FIG. 7 is a sectional view showing a lens configuration of a zoom lens according to Example 3 of the present application together with a moving trajectory of each lens group.

The zoom lens according to Example 3 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a negative meniscus lens L12 having a convex surface facing the object side, a negative meniscus lens L13 having a convex surface facing the object side, and a positive meniscus lens L14 having a convex surface facing the object side.

The second lens group G2 is composed of, in order from the object side, a positive meniscus lens L21 having a convex surface facing the object side, an aperture stop S, a cemented lens constructed by a double convex positive lens L22 cemented with a double concave negative lens L23, a cemented lens constructed by a negative meniscus lens L24 having a convex surface facing the object side cemented with a double convex positive lens L25, and a cemented lens constructed by a double convex positive lens L26 cemented with a negative meniscus lens L27 having a concave surface facing the object side.

With this configuration, in the zoom lens according to Example 3, the first lens group G1 and the second lens group G2 are moved along an optical axis such that a distance between the first lens group G1 and the second lens group G2 decreases, thereby carrying out zooming from a wide-angle end state to a telephoto end state.

Moreover, in the zoom lens according to Example 3, only the positive meniscus lens L21 in the second lens group G2 is moved toward the object side along the optical axis, thereby carrying out focusing from an infinitely distant object to a close object. Incidentally, the zoom lens according to Example 3 can focus up to a shooting range of 200 mm.

Moreover, in the zoom lens according to Example 3, upon generating a camera shake, only the cemented lens constructed by the negative meniscus lens L24 cemented with the positive lens L25 is moved as a vibration reduction lens group in a direction including a component perpendicular to the optical axis, thereby carrying out vibration reduction.

Various values associated with the zoom lens according to Example 3 are listed in Table 3.

TABLE 3

(Specifications)

Zoom Ratio = 1.83

| | W | M | T |
|---|---|---|---|
| f = | 6.9 | 9.5 | 12.6 |
| FNO = | 3.6 | 4.5 | 5.8 |
| 2ω = | 100.5 | 80.32 | 64.4 |
| Y = | 7.95 | 7.95 | 7.95 |
| TL = | 84.94 | 70.39 | 77.69 |
| BF = | 9.80 | 13.89 | 18.67 |

(Lens Surface Data)

| m | r | d | nd | νd |
|---|---|---|---|---|
| OP | ∞ | | | |
| 1 | 28.000 | 1.60 | 1.69350 | 53.20 |
| *2 | 8.495 | 9.76 | 1.00000 | |
| 3 | 200.000 | 1.00 | 1.77377 | 47.26 |
| *4 | 15.838 | 2.07 | 1.00000 | |
| 5 | 100.000 | 1.00 | 1.49782 | 82.51 |
| 6 | 14.186 | 1.00 | 1.00000 | |
| 7 | 14.374 | 3.07 | 1.83400 | 37.16 |
| 8 | 89.287 | (d8) | 1.00000 | |
| 9 | 17.626 | 1.20 | 1.58144 | 40.95 |
| 10 | 62.264 | (d10) | 1.00000 | |
| 11 | ∞ | 1.57 | 1.00000 | Aperture Stop S |
| 12 | 13.076 | 2.00 | 1.49782 | 82.56 |
| 13 | −16.252 | 0.80 | 1.74400 | 44.82 |
| 14 | 38.478 | 1.50 | 1.00000 | |
| 15 | 14.779 | 0.80 | 1.72000 | 50.23 |
| 16 | 8.396 | 2.24 | 1.49782 | 82.56 |
| 17 | −70.521 | 5.34 | 1.00000 | |
| 18 | 51.335 | 4.00 | 1.49782 | 82.56 |
| 19 | −8.041 | 1.00 | 1.77377 | 47.26 |
| *20 | −21.845 | BF | 1.00000 | |
| I | ∞ | | | |

TABLE 3-continued (Specifications)

(Aspherical Surface Data)

Surface Number: 2

κ = −0.4129
A4 = 1.44101E−04
A6 = −6.12435E−08
A8 = 8.13617E−09
A10 = −6.44294E−11

Surface Number: 4

κ = −7.0711
A4 = 3.13414E−04
A6 = −3.21846E−06
A8 = 4.49062E−08
A10 = −1.40653E−10

Surface Number: 20

κ = −3.7168
A4 = 1.95185E−05
A6 = −1.47476E−06
A8 = 5.16110E−08
A10 = −7.20439E−10

(Variable Distances)

| | W | M | T |
|---|---|---|---|
| <upon focusing on a infinitely distant object> | | | |
| f = | 6.9 | 9.5 | 12.6 |
| d0 = | ∞ | ∞ | ∞ |
| d8 = | 17.63 | 8.40 | 2.50 |
| d10 = | 4.20 | 4.20 | 4.20 |
| BF = | 9.80 | 13.89 | 18.67 |
| <upon shooting magnification β of −0.01> | | | |
| β = | −0.01 | −0.01 | −0.01 |
| d0 = | 668.22 | 932.37 | 1240.63 |
| d8 = | 17.84 | 8.56 | 2.63 |
| d10 = | 13.92 | 18.72 | |
| <upon shooting range RA of 200 mm> | | | |
| RA = | 200 | 200 | 200 |
| d0 = | 116.06 | 121.19 | 122.31 |
| d8 = | 18.71 | 9.47 | 3.65 |
| d10 = | 3.12 | 3.13 | 3.05 |
| BF = | 9.82 | 13.92 | 18.72 |

(Lens Group Data)

| Group | ST | Focal Length |
|---|---|---|
| 1 | 1 | −12.18 |
| 2 | 8 | 18.88 |

(Values for Conditional Expressions)

(1): (R12 + R11)/(R12 − R11) = −1.87
(2): (R22 + R21)/(R22 − R21) = −1.17
(3): (−fa)/fb = 0.25
(4): fw/(−fa) = 0.57
(5): f2/fvr = 0.56

Figure 8A:
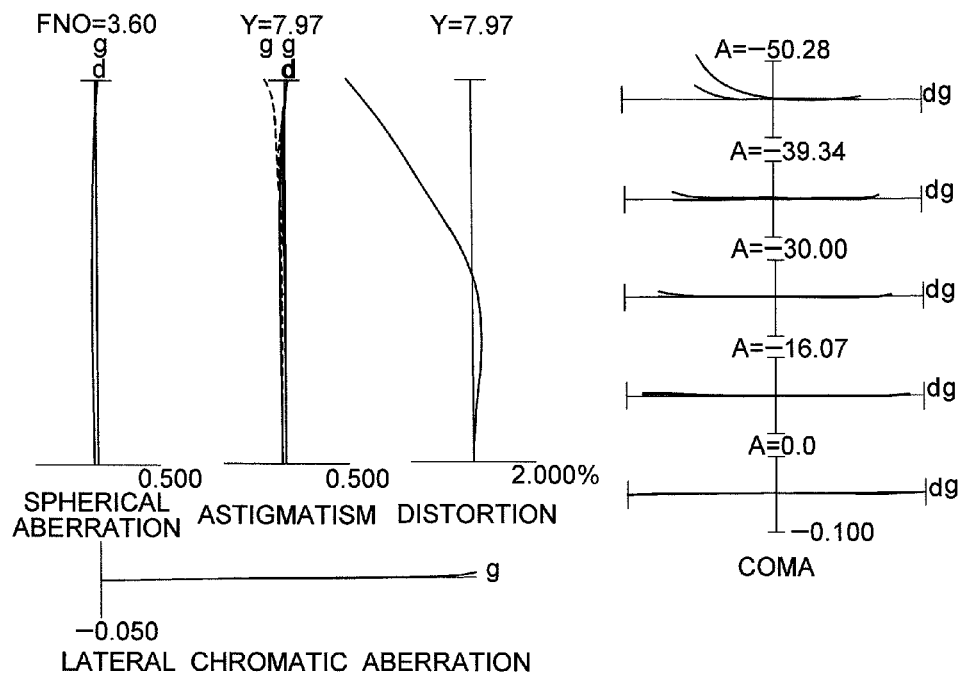
Figure 8B:
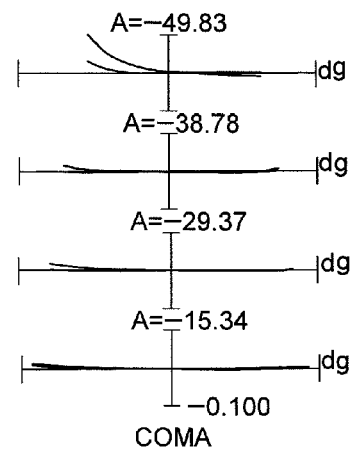

FIGS. 8A, and 8B are graphs showing various aberrations of the zoom lens according to Example 3 of the present application in a wide-angle end state focusing on an infinitely distant object, in which FIG. 8A shows various aberrations, and FIG. 8B shows coma upon carrying out vibration reduction.

Figure 9A:
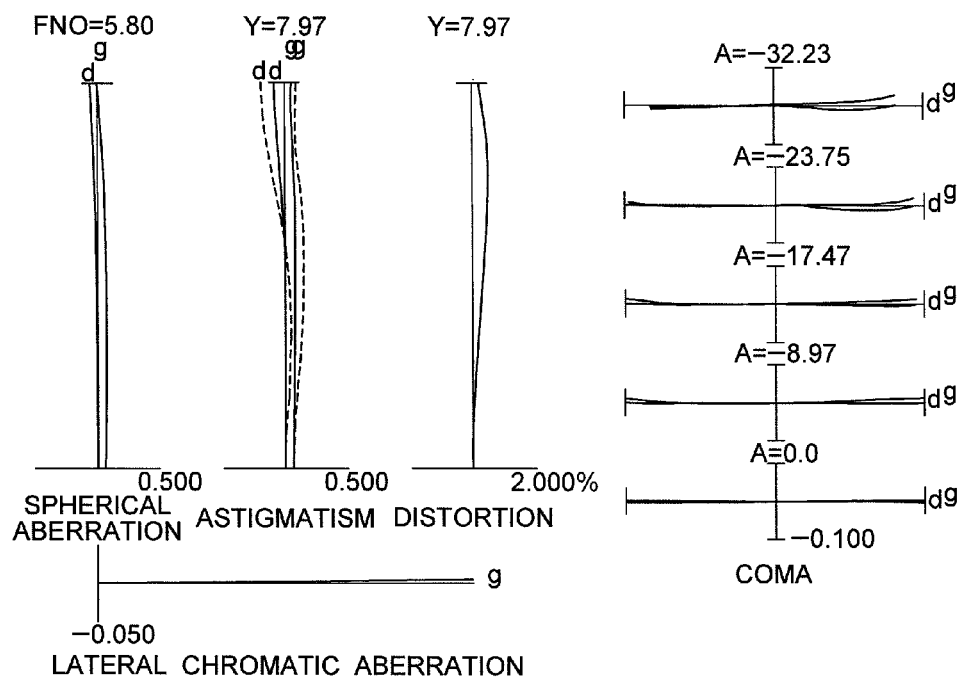
Figure 9B:
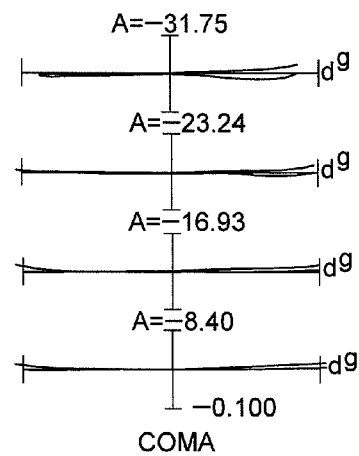

FIGS. 9A, and 9B are graphs showing various aberrations of the zoom lens according to Example 3 of the present application in a telephoto end state focusing on an infinitely distant object, in which FIG. 9A shows various aberrations, and FIG. 9B shows coma upon carrying out vibration reduction.

As is apparent from the respective graphs, the zoom lens according to Example 3 shows superb optical performance as a result of good corrections to various aberrations in each focal length state from the wide-angle end state through the telephoto end state, even upon carrying out vibration reduction.

EXAMPLE 4

Figure 10:
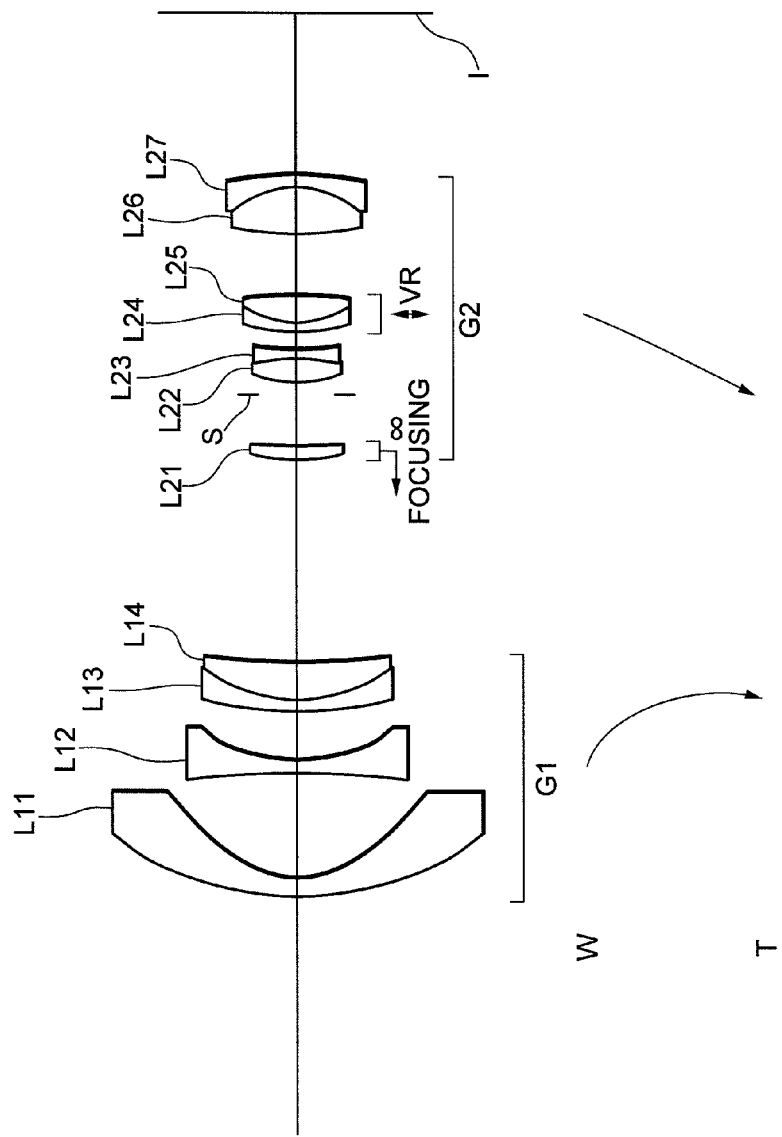
FIG. 10 is a sectional view showing a lens configuration of a zoom lens according to Example 4 of the present application.

FIG. 10 is a sectional view showing a lens configuration of a zoom lens according to Example 4 of the present application together with a moving trajectory of each lens group.

The zoom lens according to Example 4 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a double concave negative lens L12, and a cemented lens constructed by a negative meniscus lens L13 having a convex surface facing the object side cemented with a positive meniscus lens L14 having a convex surface facing the object side.

The second lens group G2 is composed of, in order from the object side, a positive meniscus lens L21 having a convex surface facing the object side, an aperture stop S, a cemented lens constructed by a double convex positive lens L22 cemented with a double concave negative lens L23, a cemented lens constructed by a negative meniscus lens L24 having a convex surface facing the object side cemented with a double convex positive lens L25, and a cemented lens constructed by a double convex positive lens L26 cemented with a negative meniscus lens L27 having a concave surface facing the object side.

With this configuration, in the zoom lens according to Example 4, the first lens group G1 and the second lens group G2 are moved along an optical axis such that a distance between the first lens group G1 and the second lens group G2 decreases, thereby carrying out zooming from a wide-angle end state to a telephoto end state.

Moreover, in the zoom lens according to Example 4, only the positive meniscus lens L21 in the second lens group G2 is moved toward the object side along the optical axis, thereby carrying out focusing from an infinitely distant object to a close object. Incidentally, the zoom lens according to Example 4 can focus up to a shooting range of 200 mm.

Moreover, in the zoom lens according to Example 4, upon generating a camera shake, only the cemented lens constructed by the negative meniscus lens L24 cemented with the positive lens L25 is moved as a vibration reduction lens group in a direction including a component perpendicular to the optical axis, thereby carrying out vibration reduction.

Various values associated with the zoom lens according to Example 4 are listed in Table 4.

TABLE 4

(Specifications)

Zoom Ratio = 1.83

| | W | M | T |
|---|---|---|---|
| f = | 6.9 | 9.5 | 12.6 |
| FNO = | 3.6 | 4.5 | 5.7 |
| 2ω = | 100.6 | 80.1 | 64.4 |
| Y = | 7.95 | 7.95 | 7.95 |
| TL = | 83.50 | 70.27 | 77.75 |
| BF = | 13.75 | 17.84 | 22.77 |

TABLE 4-continued

(Specifications)

(Lens Surface Data)

| m | r | d | nd | νd |
|---|---|---|---|---|
| OP | ∞ | | | |
| 1 | 27.218 | 1.60 | 1.69350 | 53.20 |
| *2 | 8.486 | 8.88 | 1.00000 | |
| 3 | −85.938 | 1.00 | 1.77377 | 47.26 |
| *4 | 16.755 | 4.18 | 1.00000 | |
| 5 | 34.143 | 1.00 | 1.49782 | 82.51 |
| 6 | 12.785 | 3.21 | 1.83400 | 37.16 |
| 7 | 55.130 | (d7) | 1.00000 | |
| 8 | 17.155 | 1.20 | 1.58144 | 40.95 |
| 9 | 126.426 | (d9) | 1.00000 | |
| 10 | ∞ | 1.00 | 1.00000 | Aperture Stop S |
| 11 | 14.464 | 2.00 | 1.49782 | 82.56 |
| 12 | −15.477 | 0.80 | 1.74400 | 44.82 |
| 13 | 32.383 | 1.50 | 1.00000 | |
| 14 | 16.210 | 0.80 | 1.85026 | 32.35 |
| 15 | 9.933 | 2.37 | 1.51680 | 64.11 |
| 16 | −49.763 | 5.30 | 1.00000 | |
| 17 | 31.652 | 4.00 | 1.49782 | 82.56 |
| 18 | −10.419 | 1.00 | 1.77377 | 47.26 |
| *19 | −32.091 | BF | 1.00000 | |
| I | ∞ | | | |

(Aspherical Surface Data)

Surface Number: 2

$\kappa = -0.7308$
$A4 = 2.0690E-04$
$A6 = -1.1693E-06$
$A8 = 1.0071E-08$
$A10 = -6.6985E-11$ Surface Number: 4

$\kappa = -8.0763$
$A4 = 3.2203E-04$
$A6 = -1.6297E-06$
$A8 = 1.3613E-08$
$A10 = 4.4349E-11$ Surface Number: 19

$\kappa = 0.8174$
$A4 = 7.6664E-05$
$A6 = -9.8983E-08$
$A8 = 4.4188E-10$
$A10 = 3.8090E-11$

(Variable Distances)

| | W | M | T |
|---|---|---|---|
| <upon focusing on a infinitely distant object> | | | |
| f = | 6.9 | 9.5 | 12.6 |
| d0 = | ∞ | ∞ | ∞ |
| d7 = | 17.27 | 8.36 | 2.50 |
| d9 = | 4.23 | 4.23 | 4.23 |
| BF = | 13.75 | 17.84 | 22.77 |
| <upon shooting magnification β of −0.01> | | | |
| β = | −0.01 | −0.01 | −0.01 |
| d0 = | 667.21 | 340.62 | 501.56 |
| d7 = | 17.49 | 8.75 | 2.78 |
| d9 = | 4.00 | 3.83 | 3.95 |
| BF = | 13.75 | 17.85 | 22.77 |
| <upon shooting range RA of 200 mm> | | | |
| RA = | 200 | 200 | 200 |
| d0 = | 116.50 | 99.74 | 121.73 |
| d7 = | 18.39 | 9.54 | 3.52 |
| d9 = | 3.10 | 3.05 | 3.21 |
| BF = | 13.77 | 17.89 | 22.82 |

(Lens Group Data)

| Group | ST | Focal Length |
|---|---|---|
| 1 | 1 | −11.93 |
| 2 | 8 | 18.81 |

(Values for Conditional Expressions)

Figure 11A:
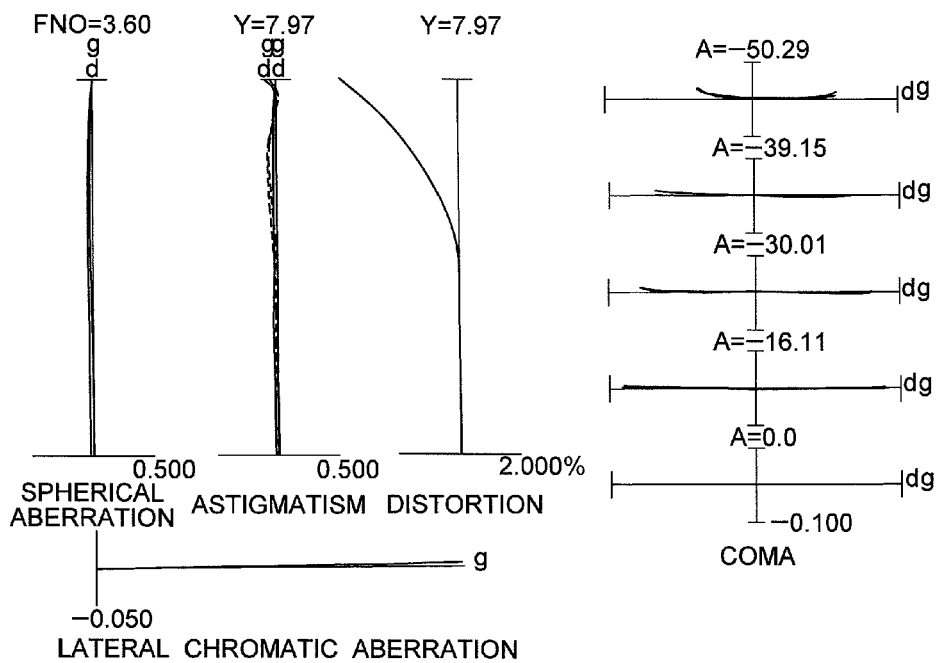
Figure 11B:
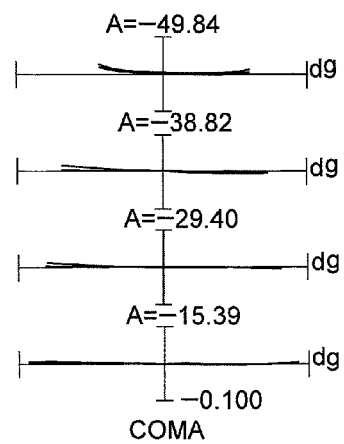

(1): $(R12 + R11)/(R12 - R11) = -1.91$
(2): $(R22 + R21)/(R22 - R21) = -0.67$
(3): $(-fa)/fb = 0.32$
(4): $fw/(-fa) = 0.58$
(5): $f2/fvr = 0.55$ FIGS. 11A, and 11B are graphs showing various aberrations of the zoom lens according to Example 4 of the present application in a wide-angle end state focusing on an infinitely distant object, in which FIG. 11A shows various aberrations, and FIG. 11B shows coma upon carrying out vibration reduction.

Figure 12A:
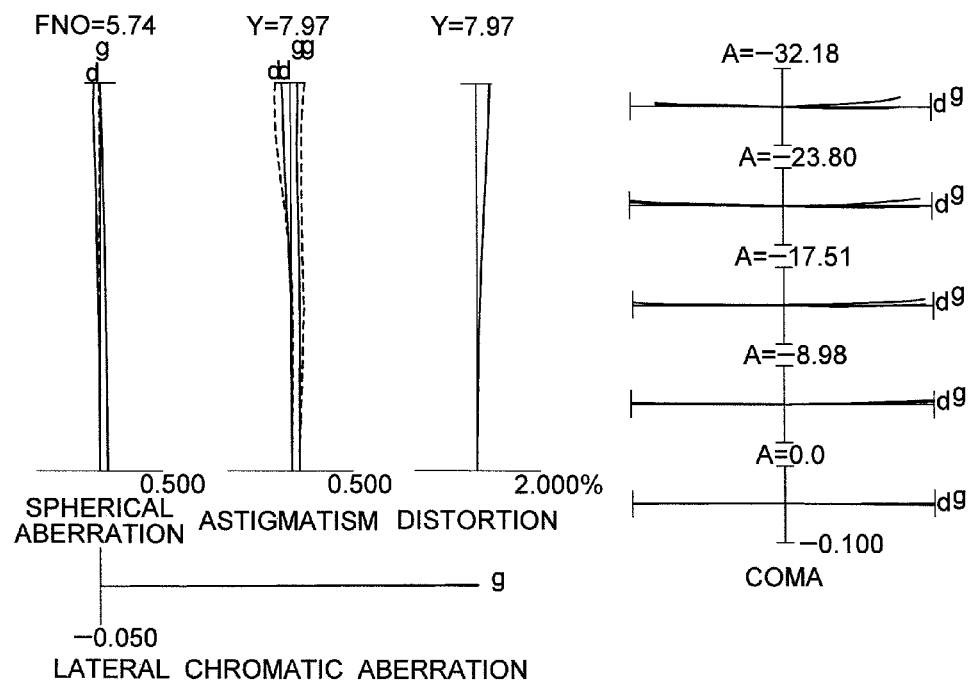
Figure 12B:
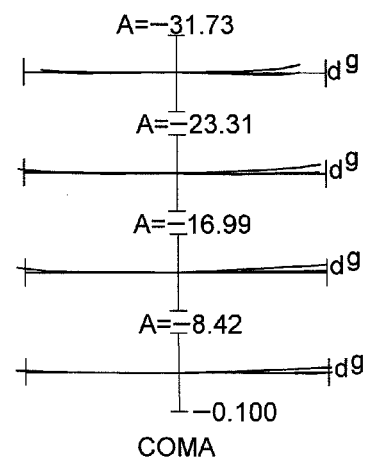

FIGS. 12A, and 12B are graphs showing various aberrations of the zoom lens according to Example 4 of the present application in a telephoto end state focusing on an infinitely distant object, in which FIG. 12A shows various aberrations, and FIG. 12B shows coma upon carrying out vibration reduction.

As is apparent from the respective graphs, the zoom lens according to Example 4 shows superb optical performance as a result of good corrections to various aberrations in each focal length state from the wide-angle end state through the telephoto end state, even upon carrying out vibration reduction.

EXAMPLE 5

FIG. 13 is a sectional view showing a lens configuration of a zoom lens according to Example 5 of the present application together with a moving trajectory of each lens group.

The zoom lens according to Example 5 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a negative meniscus lens L12 having a convex surface facing the object side, a cemented lens constructed by a negative meniscus lens L13 having a convex surface facing the object side cemented with a positive meniscus lens L14 having a convex surface facing the object side, and a positive meniscus lens L15 having a convex surface facing the object side.

The second lens group G2 is composed of, in order from the object side, a double convex positive lens L21, an aperture stop S, a cemented lens constructed by a double convex positive lens L22 cemented with a double concave negative lens L23, a cemented lens constructed by a negative meniscus lens L24 having a convex surface facing the object side cemented with a double convex positive lens L25, and a cemented lens constructed by a double convex positive lens L26 cemented with a negative meniscus lens L27 having a concave surface facing the object side.

With this configuration, in the zoom lens according to Example 5, the first lens group G1 and the second lens group G2 are moved along an optical axis such that a distance between the first lens group G1 and the second lens group G2 decreases, thereby carrying out zooming from a wide-angle end state to a telephoto end state.

Moreover, in the zoom lens according to Example 5, only the positive lens L21 in the second lens group G2 is moved toward the object side along the optical axis, thereby carrying out focusing from an infinitely distant object to a close object. Incidentally, the zoom lens according to Example 5 can focus up to a shooting range of 200 mm.

Moreover, in the zoom lens according to Example 5, upon generating a camera shake, only the cemented lens constructed by the negative meniscus lens L24 cemented with the positive lens L25 is moved as a vibration reduction lens group in a direction including a component perpendicular to the optical axis, thereby carrying out vibration reduction.

Various values associated with the zoom lens according to Example 5 are listed in Table 5.

TABLE 5

(Specifications)

Zoom Ratio = 1.78

|  | W | M | T |
|---|---|---|---|
| f = | 6.81 | 9.29 | 12.12 |
| FNO = | 4.00 | 4.58 | 5.82 |
| 2ω = | 101.75 | 81.36 | 66.18 |
| Y = | 7.95 | 7.95 | 7.95 |
| TL = | 86.46 | 80.84 | 79.04 |
| BF = | 13.94 | 17.53 | 21.62 |

(Lens Surface Data)

| m | r | d | nd | νd |
|---|---|---|---|---|
| OP | ∞ |  |  |  |
| 1 | 25.4963 | 1.6000 | 1.693501 | 53.20 |
| *2 | 8.7016 | 8.3378 | 1.000000 |  |
| 3 | 1761.2505 | 1.0000 | 1.773770 | 47.26 |
| *4 | 16.2941 | 3.8243 | 1.000000 |  |
| 5 | 320.1643 | 1.0000 | 1.497820 | 82.51 |
| 6 | 15.1875 | 2.5797 | 1.834000 | 37.16 |
| 7 | 65.6207 | 1.2850 | 1.000000 |  |
| 8 | 17.5960 | 1.0216 | 1.756920 | 31.59 |
| 9 | 22.0706 | (d9) | 1.000000 |  |
| 10 | 34.9822 | 3.0305 | 1.581440 | 40.95 |
| 11 | −131.0907 | (d11) | 1.000000 |  |
| 12 | ∞ | 0.1000 | 1.000000 | Aperture Stop S |
| 13 | 10.5784 | 2.0000 | 1.497820 | 82.56 |
| 14 | −25.3658 | 0.8000 | 1.744000 | 44.82 |
| 15 | 24.7717 | 1.7950 | 1.000000 |  |
| 16 | 15.4535 | 0.8000 | 1.719995 | 50.23 |
| 17 | 8.7427 | 6.6128 | 1.497820 | 82.56 |
| 18 | −79.6252 | 1.5000 | 1.000000 |  |
| 19 | 31.6386 | 4.0000 | 1.497820 | 82.56 |
| 20 | −8.8693 | 1.0000 | 1.773770 | 47.26 |
| *21 | −31.4776 | BF | 1.000000 |  |
| I | ∞ |  |  |  |

(Aspherical Surface Data)

Surface Number: 2

κ = −1.6202
A4 = 1.77950E−04
A6 = −8.50902E−07
A8 = 8.80151E−09
A10 = −4.92063E−11

Surface Number: 4

κ = −8.6801
A4 = 3.34768E−04
A6 = −2.31450E−06
A8 = 2.38667E−08
A10 = −6.62720E−11

TABLE 5-continued (Specifications)

Surface Number: 21

κ = −9.9668
A4 = 5.14793E−05
A6 = −1.99076E−07
A8 = 1.90083E−08
A10 = −3.13156E−10

(Variable Distances)

|  | W | M | T |
|---|---|---|---|
| <upon focusing on a infinitely distant object> | | | |
| f = | 6.81 | 9.29 | 12.12 |
| d0 = | ∞ | ∞ | ∞ |
| d9 = | 17.61 | 8.39 | 2.50 |
| d11 = | 4.21 | 4.21 | 4.21 |
| BF = | 13.94 | 17.53 | 21.62 |
| <upon shooting magnification β of −0.01> | | | |
| β = | −0.01 | −0.01 | −0.01 |
| d0 = | 658.85 | 907.83 | 1190.73 |
| d9 = | 17.85 | 8.58 | 2.66 |
| d11 = | 3.97 | 4.02 | 4.05 |
| BF = | 13.94 | 17.53 | 21.62 |
| <upon shooting range RA of 200 mm> | | | |
| RA = | 191.60 | 191.61 | 191.63 |
| d0 = | 113.54 | 119.16 | 120.96 |
| d9 = | 18.80 | 9.61 | 3.80 |
| d11 = | 3.01 | 2.99 | 2.91 |
| BF = | 13.95 | 17.56 | 21.67 |

(Lens Group Data)

| Group | ST | Focal Length |
|---|---|---|
| 1 | 1 | −12.73 |
| 2 | 10 | 18.44 |

(Values for Conditional Expressions)

(1): (R12 + R11)/(R12 − R11) = −2.04
(2): (R22 + R21)/(R22 − R21) = −1.02
(3): (−fa)/fb = 0.12
(4): fw/(−fa) = 0.66
(5): f2/fvr = 0.50

Figure 14A:
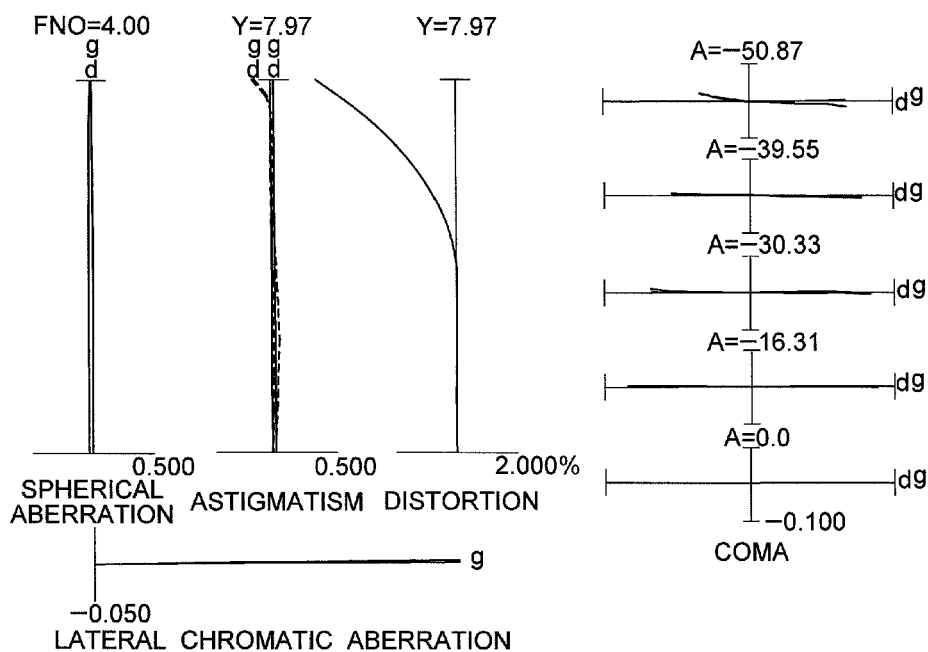
Figure 14B:
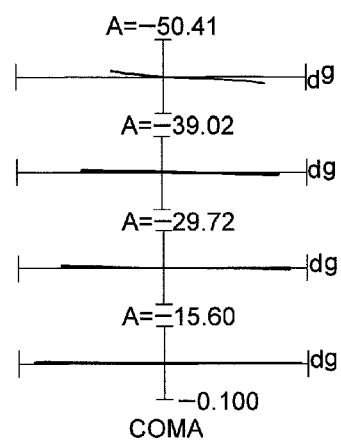

FIGS. 14A, and 14B are graphs showing various aberrations of the zoom lens according to Example 5 of the present application in a wide-angle end state focusing on an infinitely distant object, in which FIG. 14A shows various aberrations, and FIG. 14B shows coma upon carrying out vibration reduction.

Figure 15A:
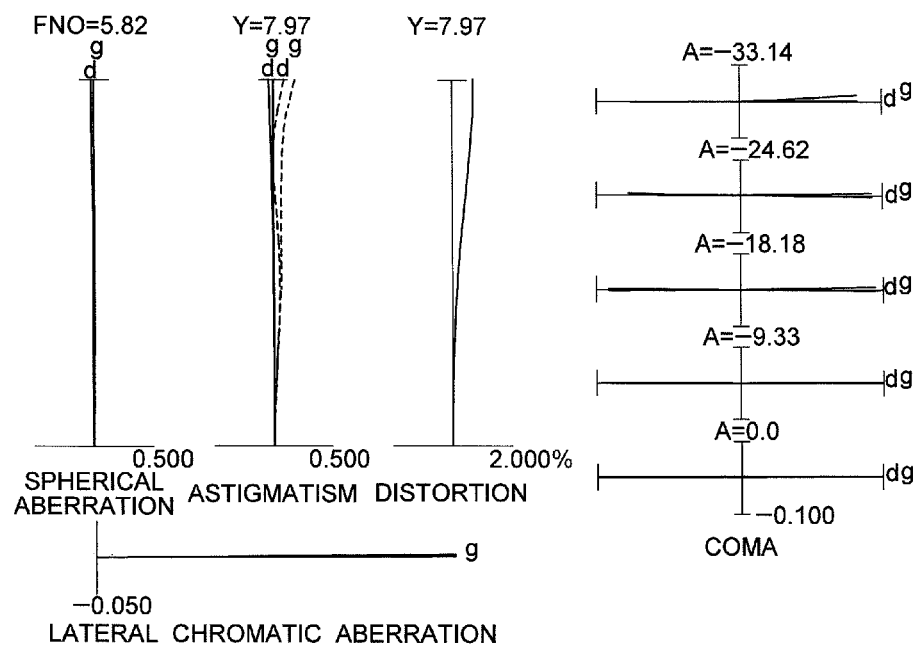
Figure 15B:
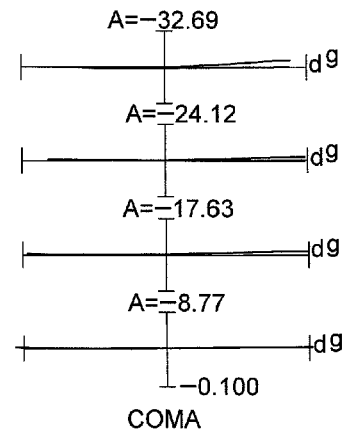

FIGS. 15A, and 15B are graphs showing various aberrations of the zoom lens according to Example 5 of the present application in a telephoto end state focusing on an infinitely distant object, in which FIG. 15A shows various aberrations, and FIG. 15B shows coma upon carrying out vibration reduction.

As is apparent from the respective graphs, the zoom lens according to Example 5 shows superb optical performance as a result of good corrections to various aberrations in each focal length state from the wide-angle end state through the telephoto end state, even upon carrying out vibration reduction.

Each Example described above makes it possible to realize a two-lens-group zoom lens having a wider angle of view and excellent optical performance with being compact and lightweight. Each Example only shows a specific example for the purpose of better understanding of the present application.

Accordingly, it is needless to say that the application in its broader aspect is not limited to the specific details and representative devices.

Incidentally, the following description may suitably be applied within limits that do not deteriorate optical performance.

In the above described Examples, although a zoom lens having a two-lens-group configuration has been shown, the above described lens configuration can be applied to other lens configurations such as a three-lens-group configuration and a four-lens-group configuration. Specifically, a lens configuration in which a lens or a lens group is added to the most object side, or the most image side may be possible. Incidentally, a lens group is defined as a portion having at least one lens that is separated from the other portions by air spaces that vary upon zooming.

In a zoom lens according to the present application, in order to vary focusing from an infinitely distant object to a close object, a portion of a lens group, a single lens group or a plurality of lens groups may be moved as a focusing lens group along the optical axis. It is particularly preferable that at least a portion of the second lens group is used as the focusing lens group. In this case, the focusing lens group can be used for auto focus, and suitable for being driven by a motor such as an ultrasonic motor.

In a zoom lens according to the present application, a lens group or a portion of a lens group may be moved in a direction having a component perpendicular to the optical axis, or swayed in a direction including the optical axis for making it as a vibration reduction lens group that corrects an image blur caused by a camera shake. It is particularly preferable in a zoom lens according to the present application that at lest a portion of the second lens group is made to be the vibration reduction lens group.

Moreover, any lens surface in a zoom lens according to the present application may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

In a zoom lens according to the present application, although an aperture stop S is preferably disposed in the second lens group or in the vicinity thereof, the function may be substituted by a lens frame without disposing a member as an aperture stop.

An antireflection coating having high transmittance over a broad wavelength range may be applied to each lens surface in a zoom lens according to the present application to reduce flare or ghost images, so that high optical performance with a high contrast can be achieved.

The zoom ratio of a zoom lens according to the present application is about 1.5 to 5.

Then, a camera equipped with a zoom lens according to the present application is explained with reference to FIG. 16.

Figure 16:
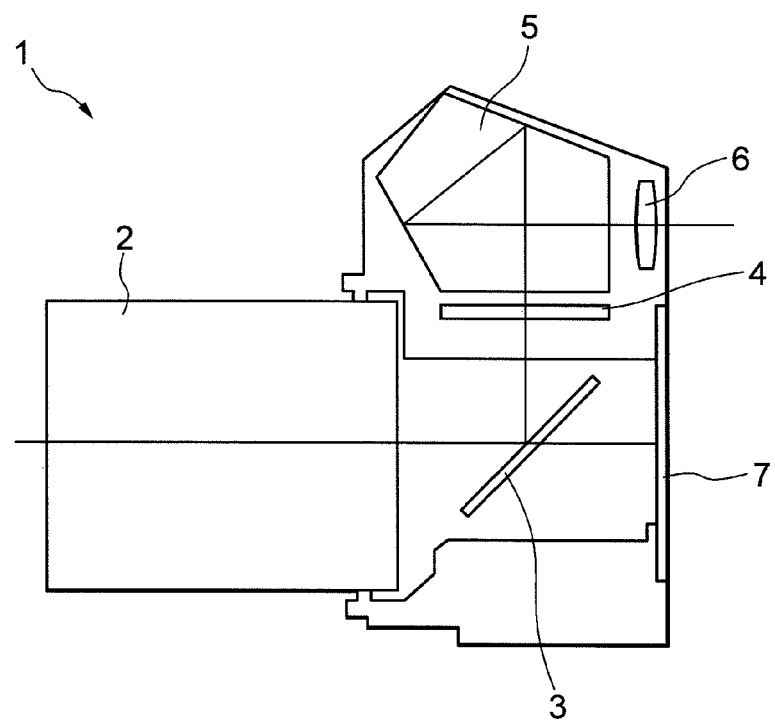
FIG. 16 is a sectional view showing a camera equipped with the zoom lens according to the present application.

FIG. 16 is a sectional view showing a camera equipped with the zoom lens according to the present application.

The camera 1 is a single-lens reflex digital camera equipped with the zoom lens according to the above-described Example 1 as an imaging lens 2.

In the camera 1, light rays coming out from an unillustrated object (the object to be photographed) are converged by the imaging lens 2, reflected by a quick return mirror 3, and focused on a focusing screen 4. The light rays focused on the focusing screen 4 are reflected a plurality of times in a pentagonal roof prism 5, and led to an eyepiece 6. Accordingly, a photographer can observe the object image as an erected image through the eyepiece 6.

When the photographer presses a release button (not shown) all the way down, the quick return mirror 3 is retracted from the optical path, the light rays from the object reach an imaging device 7. Accordingly, the light rays from the object are captured by the imaging device 7, and the photographed image is stored in a memory (not shown). In this manner, the photographer can take a picture of the object by the camera 1.

Here, the zoom lens according to Example 1 installed in the camera 1 as an imaging lens 2 has excellent optical performance and high resolution with being compact and lightweight. Accordingly, the camera 1 makes it possible to realize excellent optical performance and high resolution with making it compact and lightweight. The same effect as the above-described camera 1 can be obtained upon constructing a camera equipped with any one of zoom lens according to Examples 2 through 5 as an imaging lens 2. Moreover, the same effect can be obtained upon installing any one of zoom lens according to the above-described each Example into a camera having no quick-return mirror 3.

Then, an outline of a method for manufacturing a zoom lens according to the present application is explained with reference to FIGS. 17 through 19.

Figure 17:
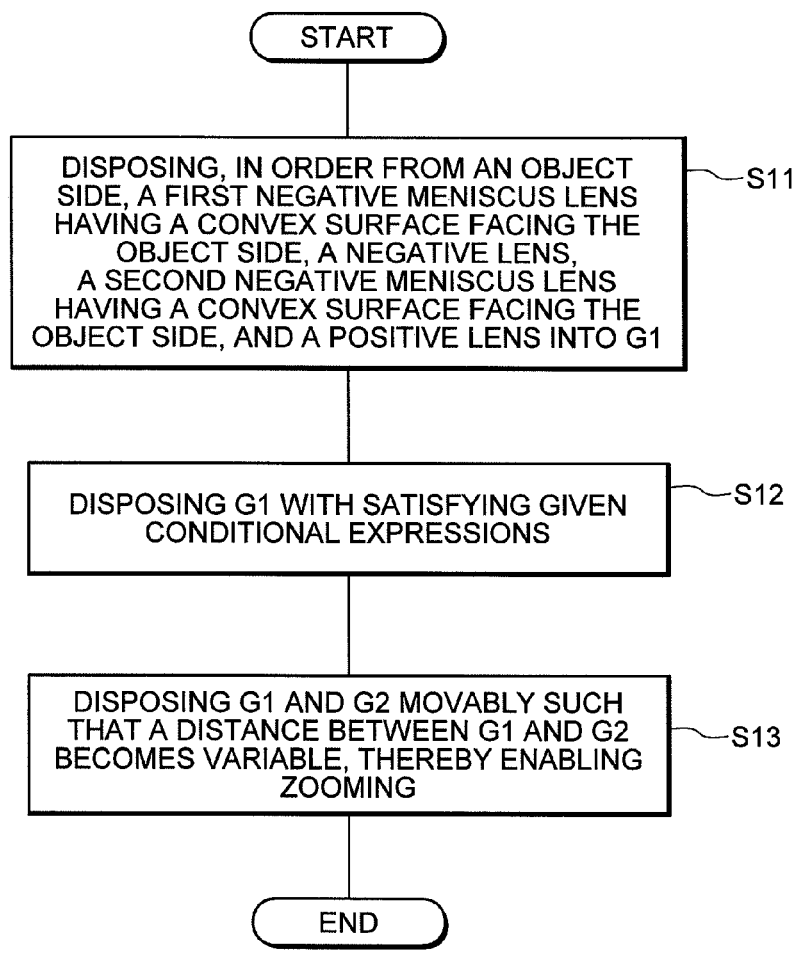
FIG. 17 is a flowchart schematically explaining a method for manufacturing the zoom lens according to the present application.

A method for manufacturing the zoom lens according to the present application shown in FIG. 17 is a method for manufacturing a zoom lens including, in order from an object side, a first lens group having negative refractive power and a second lens group having positive refractive power, the method including the following steps S11 through S13.

Step S11: Disposing, in order from an object side, a first negative meniscus lens having a convex surface facing the object side, a negative lens, a second negative meniscus lens having a convex surface facing the object side, and a positive lens into the first lens group.

Step S12: Disposing the first lens group with satisfying conditional expressions (1) and (2), and disposing, in order from the object side, the first lens group and the second lens group into a lens barrel:

$$-3.00 < (R12+R11)/(R12-R11) < -1.50 \quad (1)$$

$$-2.50 < (R22+R21)/(R22-R21) < 0.00 \quad (2)$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens.

Step S13: Disposing the first lens group and the second lens group movably by means of providing a well-known moving mechanism such that a distance between the first lens group and the second lens group becomes variable, thereby enabling zooming.

With the method for manufacturing a zoom lens according to the present application, it becomes possible to manufacture a zoom lens having excellent optical performance and high resolution with being compact and lightweight.

Figure 18:
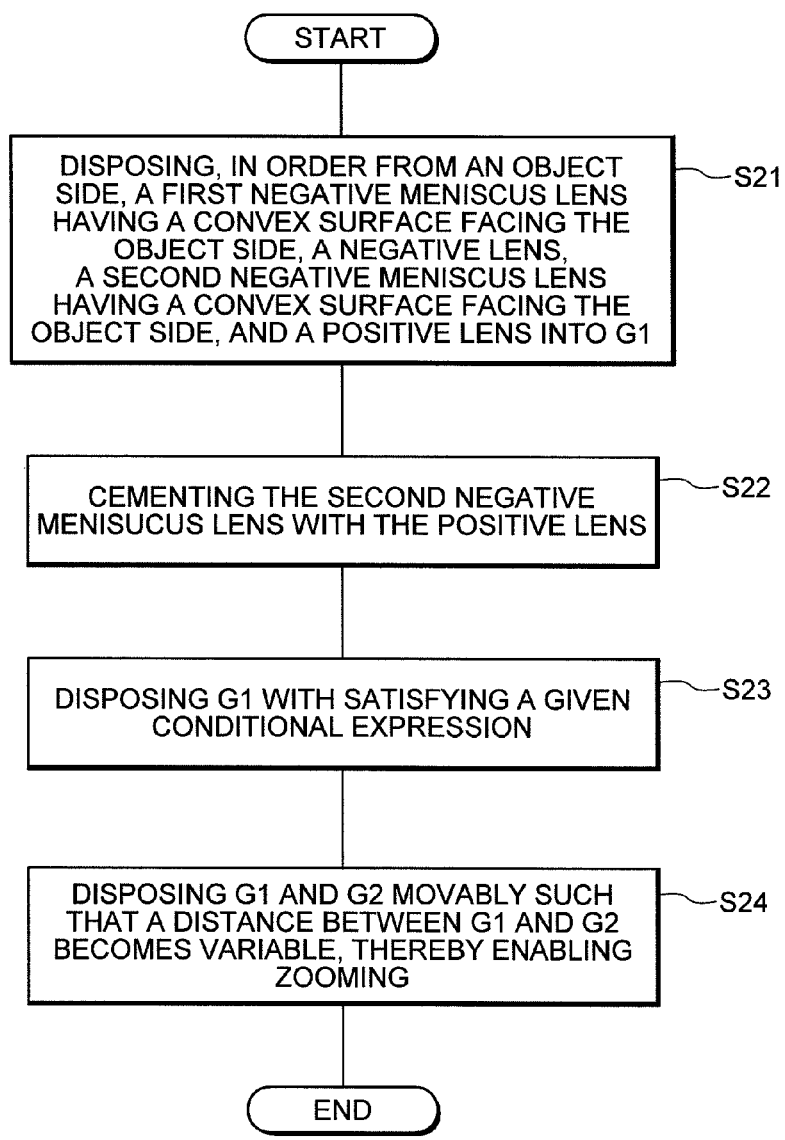
FIG. 18 is a flowchart schematically explaining a method for manufacturing the zoom lens seen from another point of view according to the present application.

A method for manufacturing the zoom lens seen from another point of view according to the present application shown in FIG. 18 is a method for manufacturing a zoom lens including, in order from an object side, a first lens group having negative refractive power and a second lens group having positive refractive power, the method including the following steps S21 through S24.

Step S21: Disposing, in order from an object side, a first negative meniscus lens having a convex surface facing the object side, a negative lens, a second negative meniscus lens having a convex surface facing the object side, and a positive lens into the first lens group.

Step S22: Cementing the second negative meniscus lens with the positive lens.

Step S23: Disposing the first lens group with satisfying conditional expression (3), and disposing, in order from the object side, the first lens group and the second lens group into a lens barrel:

$$0.00 < (-fa)/fb \quad (3)$$

where fa denotes a combined focal length of the first negative meniscus lens, the negative lens, the second negative meniscus lens, and the positive lens, and fb denotes a combined focal length of the second negative meniscus lens and the positive lens.

Step S24: Disposing the first lens group and the second lens group movably by means of providing a well-known moving mechanism such that a distance between the first lens group and the second lens group becomes variable, thereby enabling zooming.

With the method for manufacturing a zoom lens seen from another point of view according to the present application, it becomes possible to manufacture a zoom lens having excellent optical performance and high resolution with being compact and lightweight.

Figure 19:
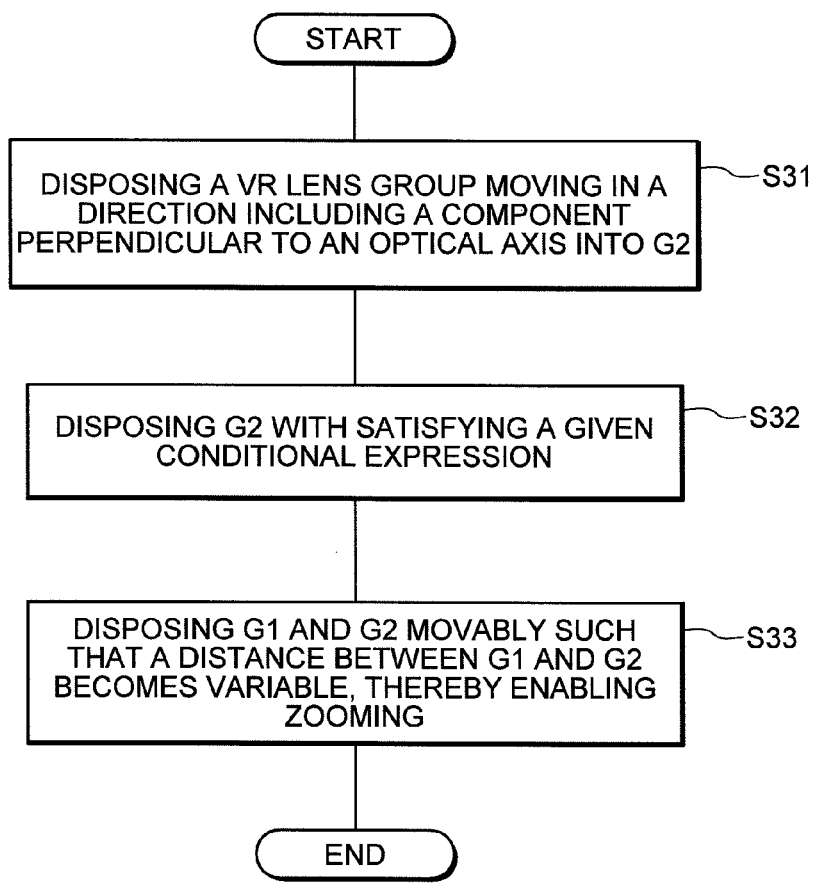
FIG. 19 is a flowchart schematically explaining a method for manufacturing the zoom lens seen from still another point of view according to the present application.

A method for manufacturing the zoom lens seen from still another point of view according to the present application shown in FIG. 19 is a method for manufacturing a zoom lens including, in order from an object side, a first lens group having negative refractive power and a second lens group having positive refractive power, the method including the following steps S31 through S33.

Step S31: Disposing a vibration reduction lens group moving in a direction including a component perpendicular to an optical axis into the second lens group by means of providing a well-known moving mechanism.

Step S32: Disposing the second lens group with satisfying conditional expression (5), and disposing, in order from the object side, the first lens group and the second lens group into a lens barrel.

Step S33: Disposing the first lens group and the second lens group movably by means of providing a well-known moving mechanism such that a distance between the first lens group and the second lens group becomes variable, thereby enabling zooming.

With the method for manufacturing a zoom lens seen from still another point of view according to the present application, it becomes possible to manufacture a zoom lens having excellent optical performance and high resolution with being compact and lightweight.

What is claimed is:

1. A zoom lens comprising, in order from an object side:
a first lens group having negative refractive power; and
a second lens group having positive refractive power,
the first lens group including, in order from the object side, a first negative meniscus lens having a convex surface facing the object side, a negative lens, a second negative meniscus lens having a convex surface facing the object side, and a positive lens,
a distance between the first lens group and the second lens group being varied thereby carrying out zooming, and
the following conditional expressions being satisfied:

$$-3.00 < (R12+R11)/(R12-R11) < -1.50$$

$$-2.50 < (R22+R21)/(R22-R21) < 0.00$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens.

2. The zoom lens according to claim 1, wherein the second meniscus lens is cemented with the positive lens.

3. The zoom lens according to claim 1, wherein the following conditional expression is satisfied:

$$0.00 < (-fa)/fb$$

where fa denotes a combined focal length of the first negative meniscus lens, the negative lens, the second negative meniscus lens, and the positive lens, and fb denotes a combined focal length of the second negative meniscus lens and the positive lens.

4. The zoom lens according to claim 1, wherein the following conditional expression is satisfied:

$$0.40 < fw/(-fa) < 0.70$$

where fw denotes a focal length of the zoom lens in the wide-angle end state, and fa denotes a combined focal length of the first negative meniscus lens, the negative lens, the second negative meniscus lens, and the positive lens.

5. The zoom lens according to claim 1, wherein the first lens group includes at least one aspherical lens.

6. The zoom lens according to claim 1, wherein at least one lens in the second lens group is moved, thereby carrying out focusing.

7. The zoom lens according to claim 1, wherein at least one lens in the second lens group is moved in a direction including a component perpendicular to an optical axis.

8. The zoom lens according to claim 7, wherein the following conditional expression is satisfied:

$$0.10 < f2/fvr < 2.00$$

where f2 denotes a focal length of the second lens group, and fvr denotes a focal length of the vibration reduction lens group.

9. An optical apparatus equipped with the zoom lens according to claim 1.

10. A zoom lens comprising, in order from an object side:
a first lens group having negative refractive power; and
a second lens group having positive refractive power,
the first lens group including, in order from the object side, a first negative meniscus lens having a convex surface facing the object side, a negative lens, a second negative meniscus lens having a convex surface facing the object side, and a positive lens,
the second negative meniscus lens being cemented with the positive lens,
a distance between the first lens group and the second lens group being varied thereby carrying out zooming, and the following conditional expressions being satisfied:

$$-3.00 < (R12+R11)/(R12-R11) < -1.50$$

$$0.00 < (-fa)/fb$$

$$0.50 < fw/(-fa) < 0.70$$

where R11 denotes a radius of curvature of the object side lens surface of the first negative meniscus lens, R12 denotes a radius of curvature of an image side lens surface of the first negative meniscus lens, fa denotes a combined focal length of the first negative meniscus lens, the negative lens, the second negative meniscus lens, and the positive lens, and fb denotes a combined focal length of the second negative meniscus lens and the positive lens, and fw denotes a focal length of the zoom lens in the wide-angle end state.

11. The zoom lens according to claim 10, wherein the first lens group includes at least one aspherical lens.

12. The zoom lens according to claim 10, wherein at least one lens in the second lens group is moved, thereby carrying out focusing.

13. The zoom lens according to claim 10, wherein at least one lens in the second lens group is moved in a direction including a component perpendicular to an optical axis.

14. The zoom lens according to claim 13, wherein the following conditional expression is satisfied:

$$0.10 < f2/fvr < 2.00$$

where f2 denotes a focal length of the second lens group, and fvr denotes a focal length of the vibration reduction lens group.

15. A zoom lens comprising, in order from an object side:
a first lens group having negative refractive power,
the first lens group including, in order from the object side, a first negative meniscus lens having a convex surface facing the object side, two negative lenses, and a positive lens; and
a second lens group having positive refractive power,
the second lens group including, only as a portion of the second lens group, a vibration reduction lens group that moves in a direction including a component perpendicular to an optical axis,
a distance between the first lens group and the second lens group being varied thereby carrying out zooming, and
the following conditional expression being satisfied:

$$0.10 < f2/fvr < 2.00$$

where f2 denotes a focal length of the second lens group, and fvr denotes a focal length of the vibration reduction lens group.

16. The zoom lens according to claim 15, wherein the two negative lenses in the first lens group are a negative lens and a second negative meniscus lens having a convex surface facing the object side.

17. A method for manufacturing a zoom lens including, in order from an object side, a first lens group having negative refractive power, and a second lens group having positive refractive power, the method comprising steps of:
disposing, in order from the object side, a first negative meniscus lens having a convex surface facing the object side, a negative lens, a second negative meniscus lens having a convex surface facing the object side, and a positive lens into the first lens group;
disposing the first lens group with satisfying the following conditional expressions:

$$-3.00 < (R12+R11)/(R12-R11) < -1.50$$

$$-2.50 < (R22+R21)/(R22-R21) < 0.00$$

where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens; and
disposing the first lens group and the second lens group movably such that a distance between the first lens group and the second lens group becomes variable, thereby enabling zooming.

18. The method according to claim 17, further comprising a step of:
cementing the second meniscus lens with the positive lens.

19. The method according to claim 17, further comprising a step of:
disposing the first lens group with satisfying the following conditional expression:

$$0.00 < (-fa)/fb$$

where fa denotes a combined focal length of the first negative meniscus lens, the negative lens, the second negative meniscus lens, and the positive lens, and fb denotes a combined focal length of the second negative meniscus lens and the positive lens.

20. The method according to claim 17, further comprising a step of:
disposing each lens with satisfying the following conditional expression:

$$0.40 < fw/(-fa) < 0.70$$

where fw denotes a focal length of the zoom lens in the wide-angle end state, and fa denotes a combined focal length of the first negative meniscus lens, the negative lens, the second negative meniscus lens, and the positive lens.

21. A method for manufacturing a zoom lens including, in order from an object side, a first lens group having negative refractive power, and a second lens group having positive refractive power, the method comprising steps of:
disposing, in order from the object side, a first negative meniscus lens having a convex surface facing the object side, a negative lens, a second negative meniscus lens having a convex surface facing the object side, and a positive lens into the first lens group;
cementing the second negative meniscus lens with the positive lens;
disposing the first lens group with satisfying following conditional expressions:

$$-3.00 < (R12+R11)/(R12-R11) < -1.50$$

$$0.00 < (-fa)/fb$$

$$0.50 < fw/(-fa) < 0.70$$

where R11 denotes a radius of curvature of the object side lens surface of the first negative meniscus lens, R12 denotes a radius of curvature of an image side lens surface of the first negative meniscus lens, fa denotes a combined focal length of the first negative meniscus lens, the negative lens, the second negative meniscus lens, and the positive lens, and fb denotes a combined focal length of the second negative meniscus lens and the positive lens, and fw denotes a focal length of the zoom lens in the wide-angle end state; and disposing the first lens group and the second lens group movably such that a distance between the first lens group and the second lens group becomes variable, thereby enabling zooming.

22. A method for manufacturing a zoom lens including, in order from an object side, a first lens group having negative refractive power, and a second lens group having positive refractive power, the method comprising steps of:
   disposing, in order from the object side, a first negative meniscus lens having a convex surface facing the object side, two negative lenses, and a positive lens into the first lens group;
   disposing a vibration reduction lens group moving in a direction including a component perpendicular to an optical axis into the second lens group, the vibration reduction lens group being only a portion of the second lens group;
   disposing the second lens group with satisfying the following conditional expression:

$0.10 < f2/fvr < 2.00$ where f2 denotes a focal length of the second lens group, and fvr denotes a focal length of the vibration reduction lens group; and
   disposing the first lens group and the second lens group movably such that a distance between the first lens group and the second lens group becomes variable, thereby enabling zooming.

23. A zoom lens comprising, in order from an object side:
   a first lens group having negative refractive power; and
   a second lens group having positive refractive power,
   the first lens group including, in order from the object side, a first negative meniscus lens having a convex surface facing the object side, a negative lens, a second negative meniscus lens having a convex surface facing the object side, and a positive lens,
   a distance between the first lens group and the second lens group being varied thereby carrying out zooming, and the following conditional expressions being satisfied:

$-3.00 < (R12+R11)/(R12-R11) \leq -1.87$ $-2.50 < (R22+R21)/(R22-R21) < 0.00$ where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens.

24. A method for manufacturing a zoom lens including, in order from an object side, a first lens group having negative refractive power, and a second lens group having positive refractive power, the method comprising steps of:
   disposing, in order from the object side, a first negative meniscus lens having a convex surface facing the object side, a negative lens, a second negative meniscus lens having convex surface facing the object side, and a positive lens into the first lens group;
   disposing the first lens group with satisfying the following conditional expressions:

$-3.00 < (R12+R11)/(R12-R11) \leq -1.87$ $-2.50 < (R22+R21)/(R22-R21) < 0.00$ where R11 denotes a radius of curvature of the object side lens surface of the first negative meniscus lens, R12 denotes a radius of curvature of an image side lens surface of the first negative meniscus lens, R21 denotes a radius of curvature of the object side lens surface of the negative lens, and R22 denotes a radius of curvature of the image side lens surface of the negative lens; and
   disposing the first lens group and the second lens group movably such that a distance between the first lens group and the second lens group becomes variable, thereby enabling zooming.

* * * * *